(12) United States Patent
Iwasaki

(10) Patent No.: US 7,484,766 B2
(45) Date of Patent: Feb. 3, 2009

(54) FUEL TANK ASSEMBLY AND STRADDLE-TYPE VEHICLE HAVING THE SAME

(75) Inventor: Yusuke Iwasaki, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 165 days.

(21) Appl. No.: 11/552,060

(22) Filed: Oct. 23, 2006

(65) Prior Publication Data

US 2007/0096452 A1 May 3, 2007

(30) Foreign Application Priority Data

Oct. 24, 2005 (JP) .............................. 2005-309141

(51) Int. Cl.
*B60P 3/22* (2006.01)

(52) U.S. Cl. ...................... 280/833; 180/219; 280/834; 280/835

(58) Field of Classification Search ................. 280/835, 280/833, 834; 180/219
See application file for complete search history.

(56) References Cited

U.S. PATENT DOCUMENTS

| | | | | |
|---|---|---|---|---|
| 3,158,193 A * | 11/1964 | Anderson | .................... | 137/255 |
| 3,642,296 A * | 2/1972 | Froumajou | ................... | 280/834 |
| 3,926,274 A * | 12/1975 | Morioka et al. | ............. | 180/219 |
| 4,871,041 A * | 10/1989 | Saito et al. | ................... | 180/219 |
| 5,020,625 A * | 6/1991 | Yamauchi et al. | ............ | 180/219 |
| 5,937,962 A * | 8/1999 | Yokoyama | ................... | 180/205 |
| 6,230,690 B1 * | 5/2001 | Umetsu | ...................... | 123/509 |
| 6,260,540 B1 * | 7/2001 | Hiraiwa et al. | .............. | 123/497 |
| 6,341,792 B1 * | 1/2002 | Okuma | ..................... | 280/304.3 |
| 6,401,750 B2 * | 6/2002 | Tokunaga | .............. | 137/565.34 |
| 6,805,214 B2 * | 10/2004 | Maeda et al. | .............. | 180/69.4 |
| 6,913,693 B2 * | 7/2005 | Unuki | ...................... | 210/416.4 |
| 7,377,552 B2 * | 5/2008 | Miyabe | ...................... | 280/835 |
| 7,419,028 B2 * | 9/2008 | Yamakura et al. | ........... | 180/291 |
| 2005/0281684 A1* | 12/2005 | Kumagai et al. | ............ | 417/360 |

FOREIGN PATENT DOCUMENTS

| | | |
|---|---|---|
| JP | 2004-182018 | 7/2004 |
| JP | 2005291164 A | 10/2005 |
| WO | 2004072469 A1 | 8/2004 |

OTHER PUBLICATIONS

European Search Report for Corresponding European application 06022150.4 lists the references above.

* cited by examiner

*Primary Examiner*—Paul N Dickson
*Assistant Examiner*—Patrick Centolanzi
(74) *Attorney, Agent, or Firm*—Hogan & Hartson LLP

(57) ABSTRACT

A fuel-tank assembly disposed in a space between a rear wheel and a seat of a straddle-type vehicle without impairing ride comfort, At least part of the seat is disposed above the rear wheel. A fuel tank has a bottom including a part inclined in a front-rear direction of the vehicle above the rear wheel and below the seat. A fuel pump unit for supplying fuel in the fuel tank to an engine has a body extending on and along the inclined part of the bottom in the fuel tank.

9 Claims, 21 Drawing Sheets

FUEL TANK ASSEMBLY AND STRADDLE-TYPE VEHICLE HAVING THE SAME

RELATED APPLICATIONS

This application claims the benefit of priority under 35 USC 119 of Japanese patent application no. 2005-309141, filed on Oct. 24, 2005, which application is hereby incorporated by reference in its entirety.

BACKGROUND OF THE INVENTION

1. Field of the Invention

The present invention relates to a straddle-type vehicle having a fuel-tank assembly accommodating a fuel pump and, more particularly, to the shape of a fuel tank disposed between a rear wheel and a seat and the arrangement of the fuel pump.

2. Description of Related Art

There has been a motorcycle in which part of a seat is disposed above a rear wheel and a fuel tank having a vertically erect fuel pump therein is disposed between the seat and the rear wheel, as disclosed in JP-A-2004-182018

However, since the related art has a structure in which the fuel pump is disposed erectly in the vertical direction in the fuel tank, it imposes limits on reducing the vertical length of the fuel tank. Therefore, in order to reduce the height from the supporting surface of the rear wheel to the top face of the seat to a specified threshold or below determined to meet requirements, it has been necessary in the prior art to reduce the thickness of the seat or the suspension stroke of the rear wheel. This impairs a comfortable ride

SUMMARY OF THE INVENTION

The invention is made in view of the above problems and provides a fuel-tank assembly that includes a fuel tank and a fuel pump unit and that is disposed in a space between the rear wheel and the seat without impairment of ride comfort, and a straddle-type vehicle including the fuel-tank assembly.

A straddle-type vehicle according to an embodiment of the invention includes a fuel tank having a bottom including a part inclined in a front-rear direction of the vehicle. A fuel pump unit for supplying fuel in the fuel tank to an engine has a body extending on and along the inclined part of the bottom in the fuel tank.

The invention thus provides a straddle-type vehicle with a fuel-tank assembly disposed in limited space without impairing ride comfort. The invention reduces the height of the fuel tank, thus enabling the fuel pump to be disposed in the fuel tank while keeping the height of the vehicle to a specified threshold or below. The straddle-type vehicle according to the invention includes, for example, a motorcycle (including an electric motor bicycle), a four-wheeled buggy, and a snowmobile. The fuel tank is not necessarily disposed directly under the seat, but may be disposed forward or rearward of the seat in the front-rear direction.

A straddle-type vehicle according to another embodiment of the invention includes a rear wheel and a seat, wherein at least a part of the seat is disposed above the rear wheel. A fuel tank has a bottom including a part inclined in a front-rear direction of the vehicle above the rear wheel and below the seat. A fuel pump unit supplies fuel in the fuel tank to an engine and has a body extending on and along the inclined part of the bottom in the fuel tank.

The invention thus provides a straddle-type vehicle having a fuel-tank assembly disposed in the limited space between the rear wheel and the seat without impairing ride comfort. The invention reduces the height of the fuel tank, thus providing sufficient seat thickness and rear wheel suspension stroke while limiting the height of the vehicle from a supporting surface of the rear wheel to a top face of the seat to a specified threshold or below.

In one aspect of the invention, the inclined part of the bottom is disposed above a front of the rear wheel with respect to a rotation shaft thereof, and inclined to the lower front. This advantageously enables the center of gravity of fuel in the fuel tank to be close to the center of gravity of the vehicle body in the front-rear direction, thus improving ride comfort.

In another aspect of the invention, the fuel pump unit further includes a discharge section disposed on the fuel tank and discharging fuel to the outside of the fuel tank. The discharge section is located at an upper part of the vehicle and is connected to an upper end of the body. This advantageously enables the discharge section to be disposed behind the seat for the driver, thereby facilitating a driver seat with a sufficient thickness.

In another aspect of the invention, the seat is disposed on a first load receiving section and a second load receiving section disposed apart from each other in the front-rear direction to receive a load on the seat; and the discharge section is disposed between the first load receiving section and the second load receiving section. This is advantageous in that a seat is provided with a sufficient thickness while protecting the discharge section from deflection of the seat due to a load.

In another aspect of the invention, the seat includes a first seat portion for a first rider and a second seat portion for a second rider on the back of the first rider. The discharge section is disposed between the first and second seat portions. Since the discharge section is disposed below neither of the first or second seat portions, sufficient thicknesses of the first and second seat portions are assured.

In another aspect of the invention, the seat is disposed on a first load receiving section disposed under the first seat portion and a second load receiving section disposed under the second seat portion. The discharge section is disposed between the first and second load receiving sections. This advantageously provides the first and second seat portions with sufficient thickness while effectively protecting the discharge section from deflection of the first and second seat portions due to a load.

In another aspect of the invention, at least part of the inclined part of the bottom is shaped like a saddle that straddles the rear wheel in the width direction. This enables the fuel tank to be disposed close to the rear wheel, thus providing sufficient seat thickness and suspension stroke of the rear wheel.

In another aspect of the invention, the bottom further includes an extending part extending in a curve from the lower end of the inclined part into the lowest position of the bottom. The fuel pump unit includes an intake section connected to the body and sucking the fuel. At least part of the intake section is disposed on the extending part. This advantageously provides sufficient tank capacity.

A fuel-tank assembly according to another embodiment of the invention includes a fuel tank mountable to a straddle-type vehicle including a seat having at least a part disposed above a rear wheel. The fuel tank has a bottom including a part inclined in a front-rear direction of the vehicle above the rear wheel and below the seat. A fuel pump unit supplies fuel in the fuel tank to an engine and has a body extending on and along the inclined part of the bottom in the fuel tank. The invention thus provides a fuel-tank assembly that can be disposed in the limited space between the rear wheel and the seat without impairing ride comfort.

Other features and advantages of the invention will be apparent from the following detailed description, taken in conjunction with the accompanying drawings which illustrate, by way of example, various features of embodiments of the invention.

DETAILED DESCRIPTION OF THE INVENTION

A fuel-tank assembly and a straddle-type vehicle having the fuel-tank assembly according to an embodiment of the invention are described in detail below with reference to the attached drawings. In this embodiment, the straddle-type vehicle according to the invention is embodied as a motorcycle.

Figure 1:
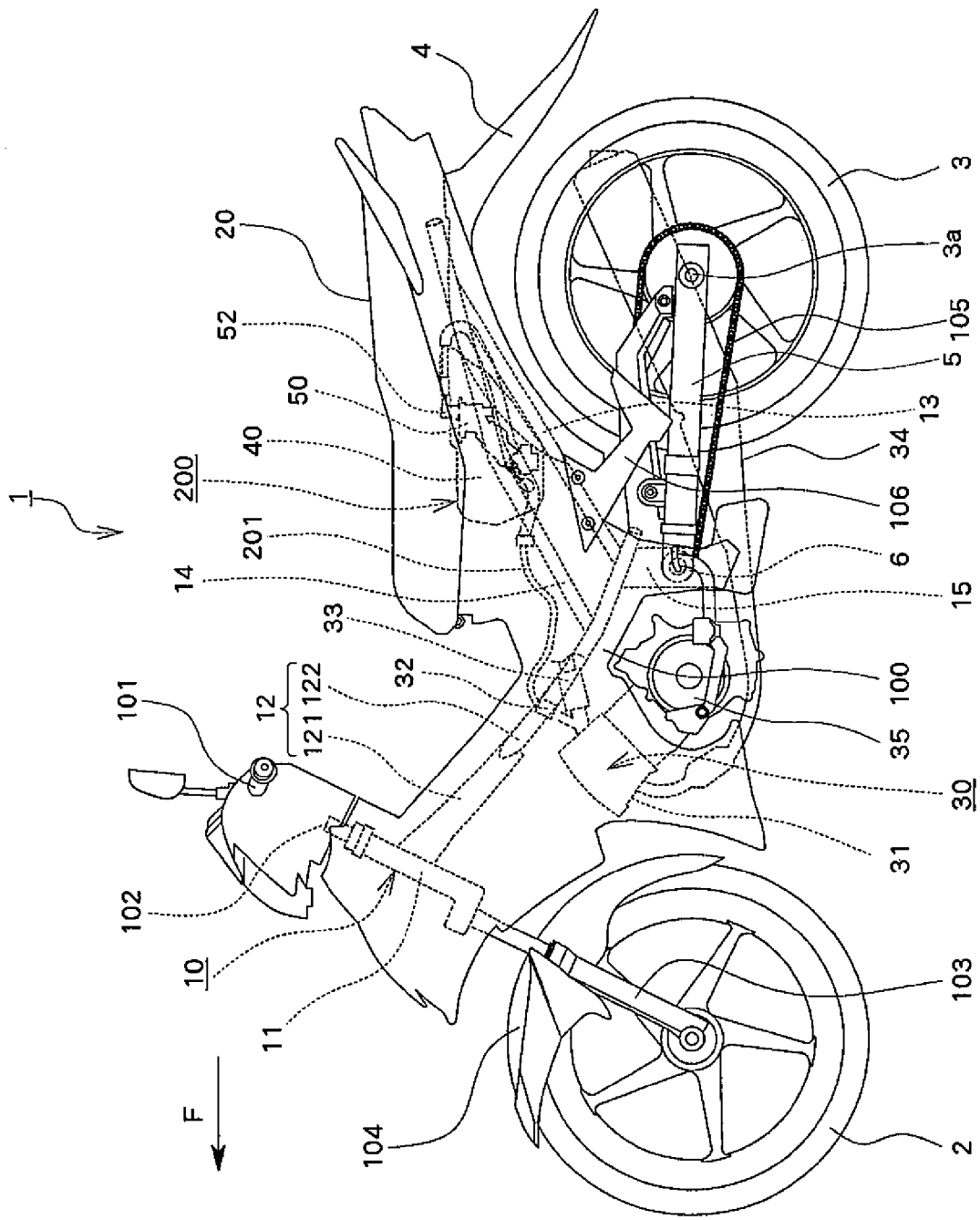
FIG. 1 is a left side view of a motorcycle according to an embodiment of the invention.

FIG. 1 is a left side view of a motorcycle 1 (hereinafter, referred to as a motorcycle 1). In this embodiment, the direction of travel of motorcycle 1 (the direction indicated by arrow F in the drawing) is referred to as the "front" of the vehicle, the direction to the right and left of the vehicle is referred to as a "width direction", and the vertical length of the vehicle is referred to as a "height", Motorcycle 1 includes a body frame 10 that forms the frame of the vehicle, a front wheel 2 that is steered by a handle 101; a rear wheel 3 vertically movably supported by rear arms 5; a seat 20 for riders; a fuel jet engine 30; and a fuel tank 40 for storing fuel.

The front end of body frame 10 is a head pipe 11 extending to the lower front in a slanting direction. Head pipe 11 has a steering shaft 102 connected at an upper end to handle 101 which is rotatably passed through. Front wheel 2 is rotatably supported at the lower end of a pair of right and left front forks 103 extending downward from steering shaft 102. A front fender 104 that covers the upper surface of front wheel 2 is disposed above front wheel 2.

Body frame 10 includes a main frame 12 composed of a first main frame 121 connected at the front end to head pipe 11 and extending above a cylinder 31 of engine 30 and a pair of right and left second main frames 122 extending from the rear end of first main frame 121 to the lower rear in a slanting direction between front wheel 2 and rear wheel 3.

Body frame 10 has a pair of right and left rear-arm brackets 15 whose upper ends are connected to the rear ends of right and left second main frames 122, respectively, and extending downward from the rear ends of second main frames 122. The pair of right and left rear arms 5 extends in the front-back direction and rotatably supports rear wheel 3 at the rear ends. The front ends of rear arms 5 are rotatably supported outside the pair of right and left rear-arm brackets 15 in the width direction by a pivot 6. As a result, the pair of right and left rear arms 5 vertically movably supports rear wheel 3 at the rear ends. A rear fender 4 is disposed above rear wheel 3 and is curved along the shape of the rear wheel 3 in the width direction and front-back direction.

Body frame 10 has a rear frame composed of a pair of right and left backstays 13 and a pair of right and left seat rails 14. Backstays 13 are connected at front ends to rear ends of second main frames 122 and extend to the upper rear in a slanting direction above pivot 6 and rear arms 5. Seat rails 14 are connected at front ends to part of second main frames 122 and extend obliquely to the upper rear above backstays 13 to support seat 20. Backstays 13 and seat rails 14 extend between seat 20 and rear wheel 3.

Seat 20 is a tandem seat in which two riders can be seated on the front and the rear. The center of seat 20 in the front-rear direction is disposed above fuel tank 40, and the rear part is disposed above rear wheel 3.

Fuel tank 40 is disposed under seat 20. The rear part of fuel tank 40 is disposed above the front of rear wheel 3 with respect to rotation shaft 3a of rear wheel 3. Fuel tank 40 accommodates part of a fuel pump unit 50 for supplying fuel in fuel tank 40 to engine 30. That is, motorcycle 1 has a fuel-tank assembly 200 having fuel tank 40 and fuel pump unit 50 under seat 20.

Fuel pump unit 50 has a discharge section 52 for discharging fuel from fuel tank 40. Discharge section 52 is disposed on fuel tank 40. Fuel discharged from discharge section 52 is supplied to engine 30 through a fuel hose 201.

Engine 30 is disposed forward of pivot 6 and below second main frames 122 between front wheel 2 and rear wheel 3. Engine 30 is preferably a single-cylinder four-cycle engine, which includes a cylinder 31 that accommodates a piston, a crank (not shown) that accommodates a crankshaft, and a clutch (not shown) that accommodates a clutch mechanism. The left side of the crank in the width direction and the right side of the clutch in the width direction are covered with a crankcase 35 and a clutch cover (not shown), respectively. The front ends of rear arms 5 are supported by rear-arm brackets 15 between crankcase 35 and rear wheel 3 and between the clutch cover (not shown) and rear wheel 3, respectively.

Cylinder 31 extends from the crank to the upper front. Cylinder 31 is connected to an injector 32 that injects fuel sent from fuel pump unit 50 through fuel hose 201 into cylinder 31 and a throttle body 33 that supplies air taken from an air cleaner (not shown) and mixed with the fuel. Cylinder 31 is also connected to a muffler 34, which is disposed on the right side of the vehicle and extends to the rear, through an exhaust pipe.

Injector 32 is electronically controlled to inject fuel into cylinder 31 according to the throttle opening degree of throttle body 33. Engine 30 burns fuel supplied from injector 32 to generate a driving force. The driving force is transmitted to rear wheel 3 via a chain 105 disposed on the left side of the vehicle. Thus, rear wheel 3 is rotated to drive motorcycle 1.

Motorcycle 1 further includes a body cover 100 that covers the left side of the body except crankcase 35, the part between seat 20 and rear wheel 3, and so on. Body cover 100 covers most of body frame 10, cylinder 31 of engine 30, injector 32, throttle body 33, fuel hose 201, fuel-tank assembly 200, and so on.

Motorcycle 1 further includes a pair of right and left rear footrest brackets 106 fixed to the pair of right and left backstays 13, respectively. In other words, a pair of right and left brackets (not shown) is fixed to the pair of right and left backstays 13 behind crankcase 35 and above rear arms 5. The upper ends of rear footrest brackets 106 are fixed to the pair of right and left brackets, respectively. Rear footrest brackets 106 extend while being inclined from the upper ends to the lower rear. The lower ends of brackets 106 are disposed outside the rear arms 5 in the width direction.

Motorcycle 1 further includes a stand (not shown) on the left side of the vehicle body that can support the body at an angle. Motorcycle 1 also has an electric system including a generator and electric wiring for power supply mainly on the right side of the body, and a fuel-supply system including fuel pump unit 50 and fuel hose 201 mainly on the left side of the body.

Figure 2:
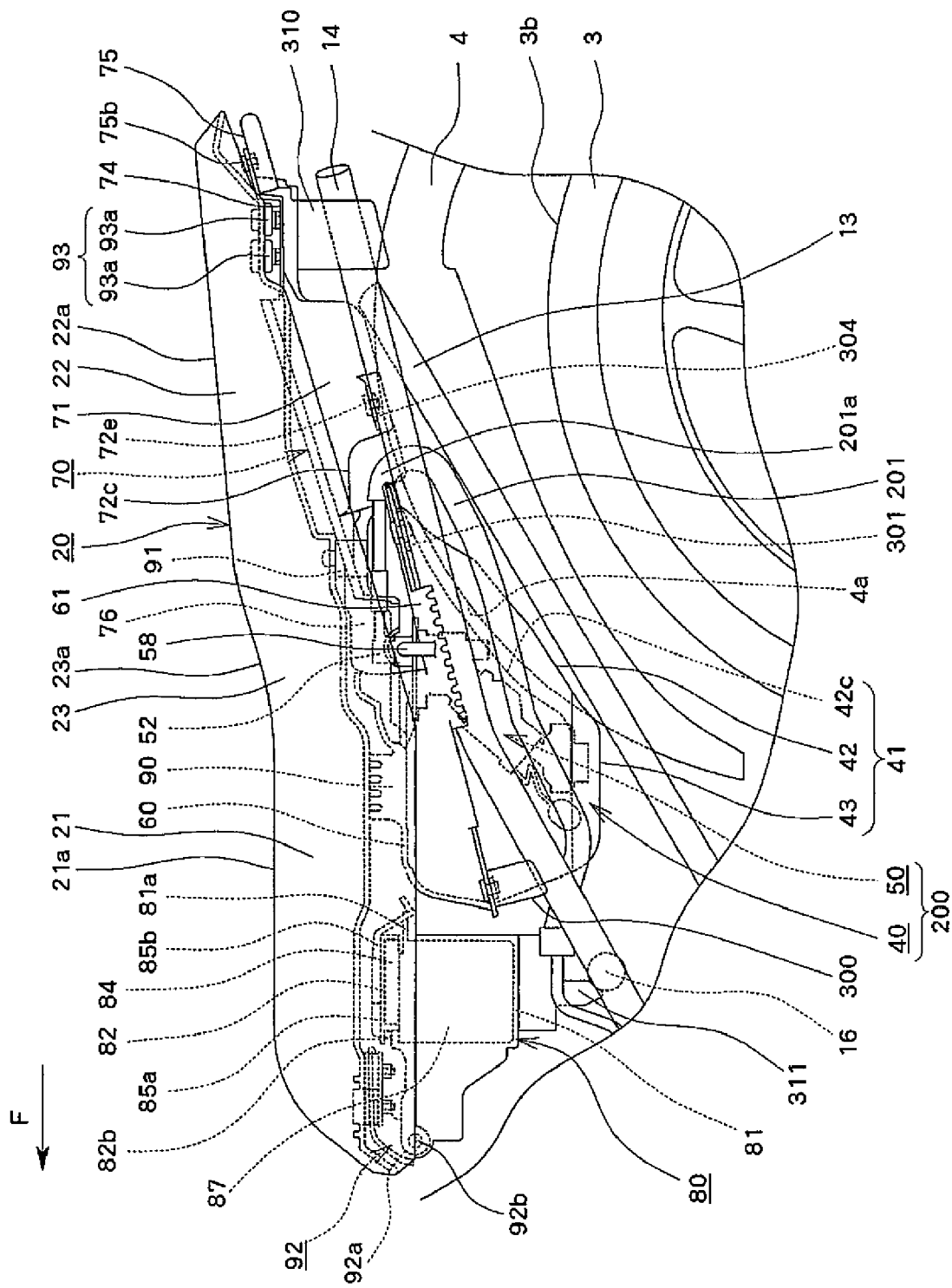
FIG. 2 is an enlarged left side view of a rear part of the motorcycle of FIG. 1.
Figure 3:
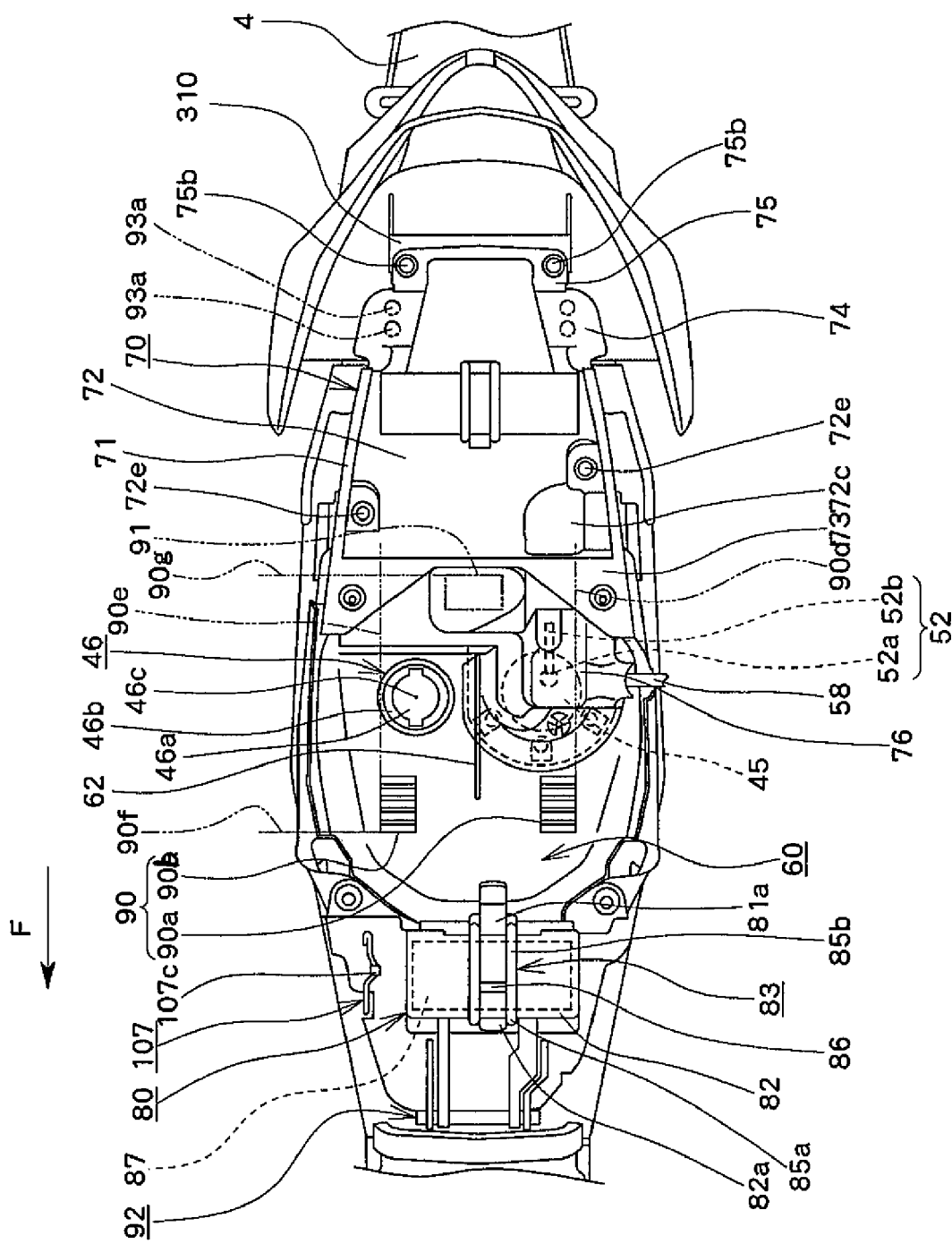
FIG. 3 is a plan view of the rear part of the motorcycle of FIG. 1.

FIG. 2 is a left side view of the rear part of motorcycle 1 with body cover 100 removed. FIG. 3 is a plan view of the rear part of motorcycle 1 with seat 20 removed.

Motorcycle 1 includes, below seat 20, a battery case 80 that accommodates a battery 87, fuel-tank assembly 200 having fuel tank 40 and fuel pump unit 50, a tank cover 60 that covers part of the upper part of fuel-tank assembly 200, and a protective member 70 having a pump cover 76 that protects discharge section 52 of fuel pump unit 50 disposed on fuel tank 40.

The substantially front half of seat 20 is a first seat portion 21 for a first rider, and the substantially rear half of seat 20 is a second seat portion 22 for a second rider. Upper surface 21a of first seat portion 21 is substantially horizontal in the front-rear direction, while upper surface 22a of second seat portion 22 is in a position higher than upper surface 21a of first seat portion 21 and inclined to the upper rear at a substantially constant incline. First seat portion 21 is disposed forward relative to rear wheel 3, while second seat portion 22 is disposed above rear wheel 3 and rear fender 4.

Upper surface 23a of intermediate part 23 of seat 20, which connects first seat portion 21 and second seat portion 22, is inclined to the upper rear at a substantially constant incline greater than that of upper surface 22a of second seat portion 22, and extends from the rear end of upper surface 21a of first seat portion 21 to the front end of upper surface 22a of second seat portion 22. Intermediate part 23 is disposed above rear wheel 3 and rear fender 4.

Seat 20 is mounted on a front load receiving section 90 disposed under the rear part of first seat portion 21 and a rear load receiving section 91 disposed under the front part of second seat portion 22. Front load receiving section 90 has a left-front load receiving section 90a and a right-front load receiving section 90b disposed with a spacing on the left and right sides in the width direction. Front load receiving sections 90a and 90b are disposed at the same position in the front-rear-direction. Rear load receiving section 91 is disposed near the center of the width behind front load receiving sections 90a and 90b.

Front load receiving sections 90a and 9b, and rear load receiving section 91 are rubber dampers for absorbing an impact on seat 20. Front load receiving sections 90a and 90b project upward from the fuel tank 40 side, while rear load receiving section 91 projects downward from the seat 20 side. Specifically, front load receiving sections 90a and 90b are integrated with and project upward from tank cover 60, while rear load receiving section 91 projects from the lower surface of seat 20.

When seat 20 is warped downward by load, front load receiving sections 90a and 90b and rear load receiving section 91 are compressed between the warped seat 20 and fuel tank 40 to be elastically deformed and decreased in vertical length slightly, thereby receiving the load on seat 20. In other words, front load receiving sections 90a and 90b mainly receive a load on first seat portion 21 on the left and right sides in the width direction, while rear load receiving section 91 mainly receives a load on second seat portion 22.

Thus, when a driver of motorcycle 1 is seated in first seat portion 21 and a passenger is seated in second seat portion 22, front load receiving section 90 mainly receives the load of the driver and rear load receiving section 91 mainly receives the load of the passenger. Thus, the load on seat 20 is received mainly by three sections: left-front load receiving section 90a, right-front load receiving section 90b, and rear load receiving section 91. Between the lower surface of intermediate part 23 and fuel tank 40, a space sandwiched between front load receiving section 90 and rear load receiving section 91 is formed, into which discharge section 52 projects.

Both front load receiving section 90 and rear load receiving section 91 are disposed on fuel tank 40. Left and right front load receiving sections 90a and 90b are disposed on the front part of the surface of fuel tank 40 facing seat 20, while rear load receiving section 91 is disposed on the rear part of the surface.

Motorcycle 1 further includes a front support section 92 disposed forward with respect to fuel tank 40 and under the front end of seat 20 to support the front end from below and a rear support section 93 disposed under the rear end of seat 20 to support the rear end from below.

Front support section 92 has a hinge 92a that rotatably supports the front end of seat 20. Hinge 92a has a hinge shaft 92b extending in the width direction. Seat 20 can be opened or closed by turning the front end about hinge shaft 92b.

Rear support section 93 has four projections 93a projecting downward from the lower surface of the rear end of seat 20. Projections 93a project by two in the front and rear at the right and left rear ends of seat 20 in the width direction, and the lower ends are in contact with part of protective member 70 to thereby support the rear end of seat 20.

Thus, seat 20 is constructed across front support section 92, rear support section 93, front load receiving section 90, and rear load receiving section 91. Specifically, seat 20 is supported at the front end by front support section 92 and at the rear end by rear support section 93, while its center of length, which is prone to be warped by a load, is supported from below by front load receiving section 90 and rear load receiving section 91. Thus, first seat portion 21 of seat 20 is constructed on front support section 92 and front load receiving section 90, while second seat portion 22 is constructed on rear load receiving section 91 and rear support section 93. The distance between front load receiving section 90 and rear load receiving section 91 in the front-rear direction is smaller than either of the distance between front load receiving section 90 and front support section 92 and the distance between rear load receiving section 91 and rear support section 93.

Figure 4:
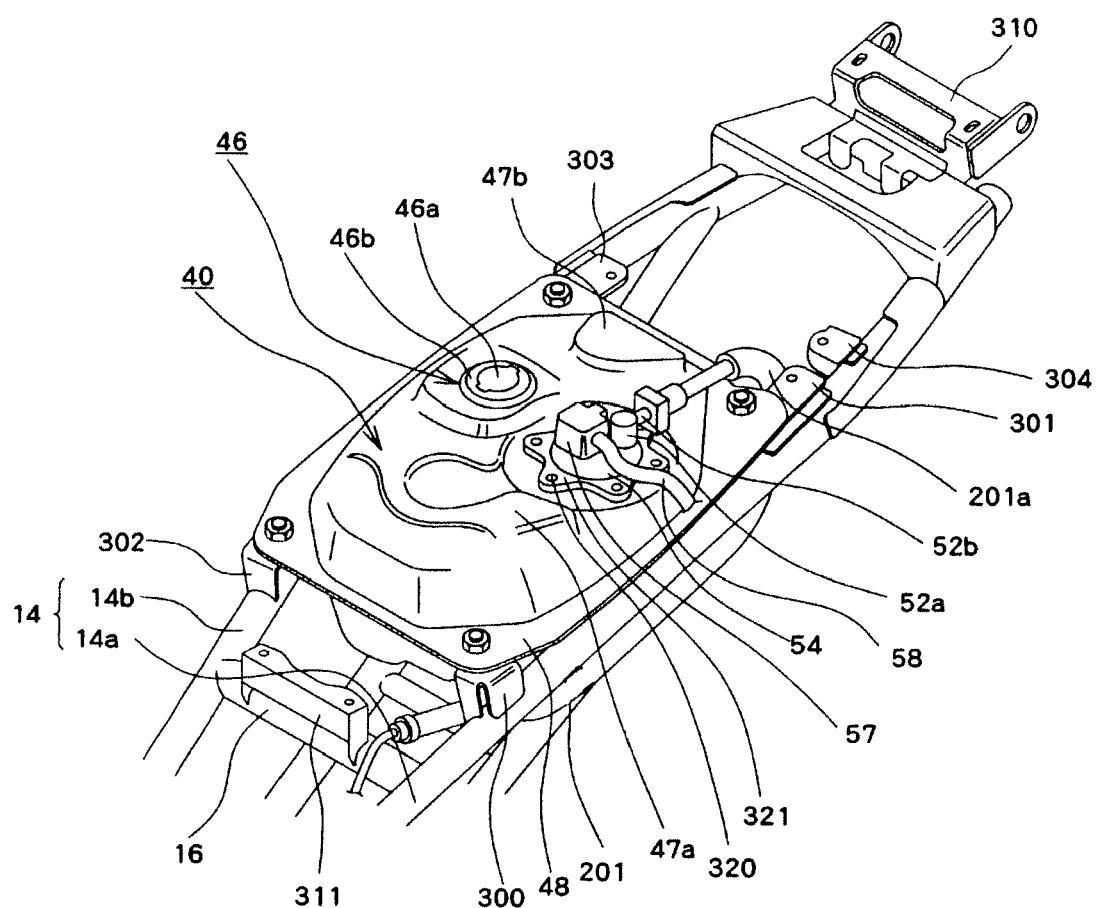
FIG. 4 is a perspective view of a fuel tank assembly mounted to the body of the motorcycle of FIG. 1.
Figure 5:
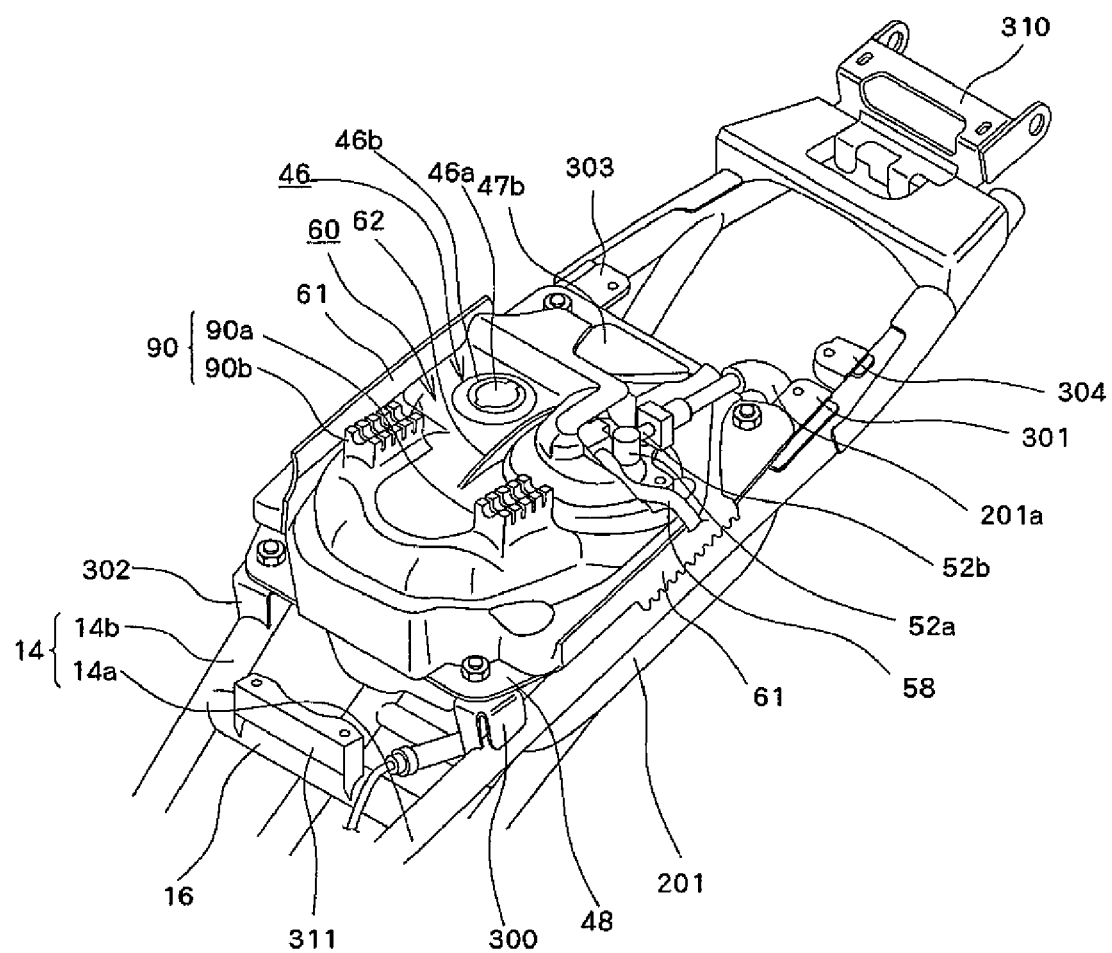
FIG. 5 is a perspective view of the vehicle body of FIG. 4 with a tank cover.
Figure 6:
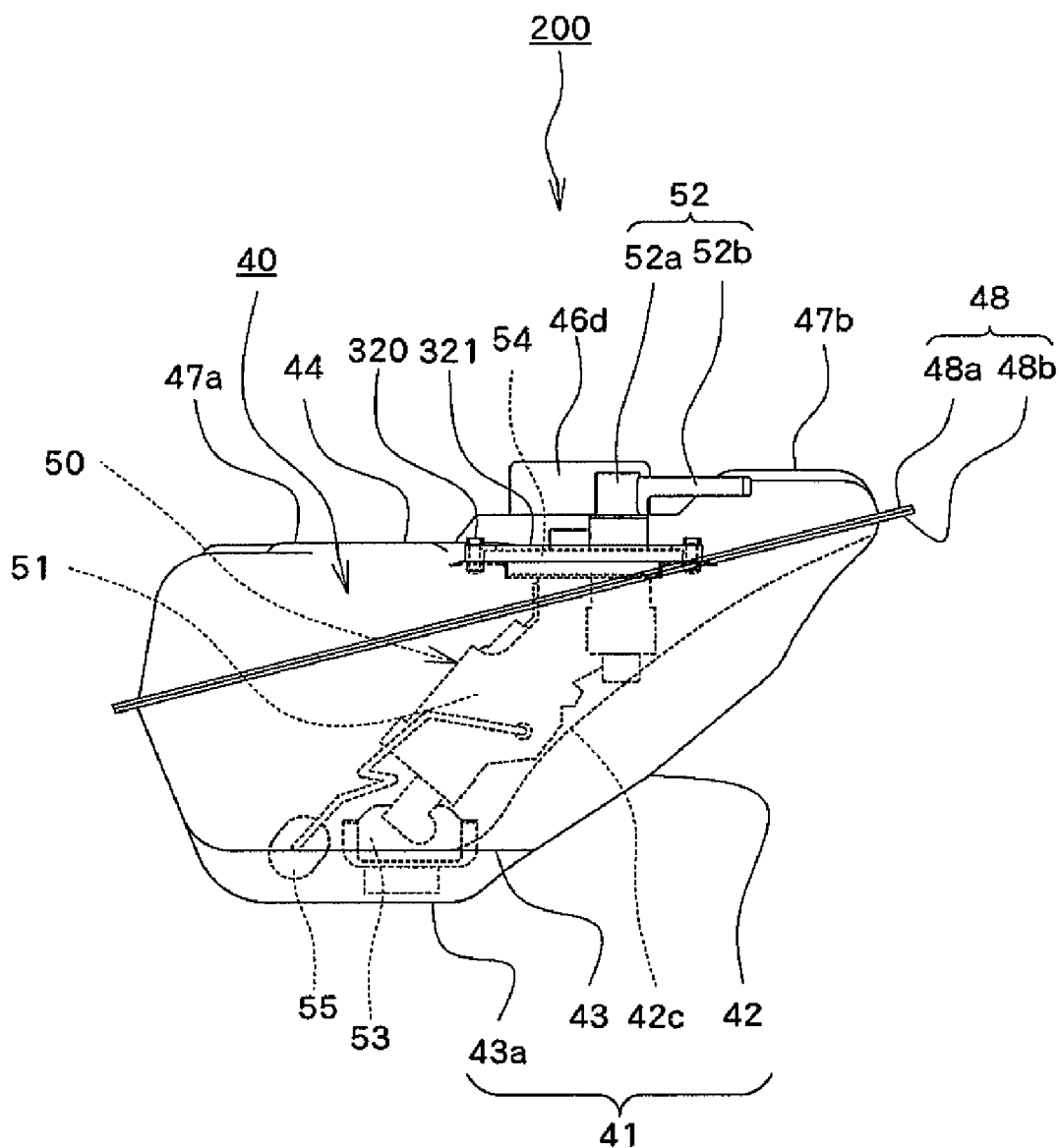
FIG. 6 is a left side view of the fuel-tank assembly of FIG. 4.
Figure 7:
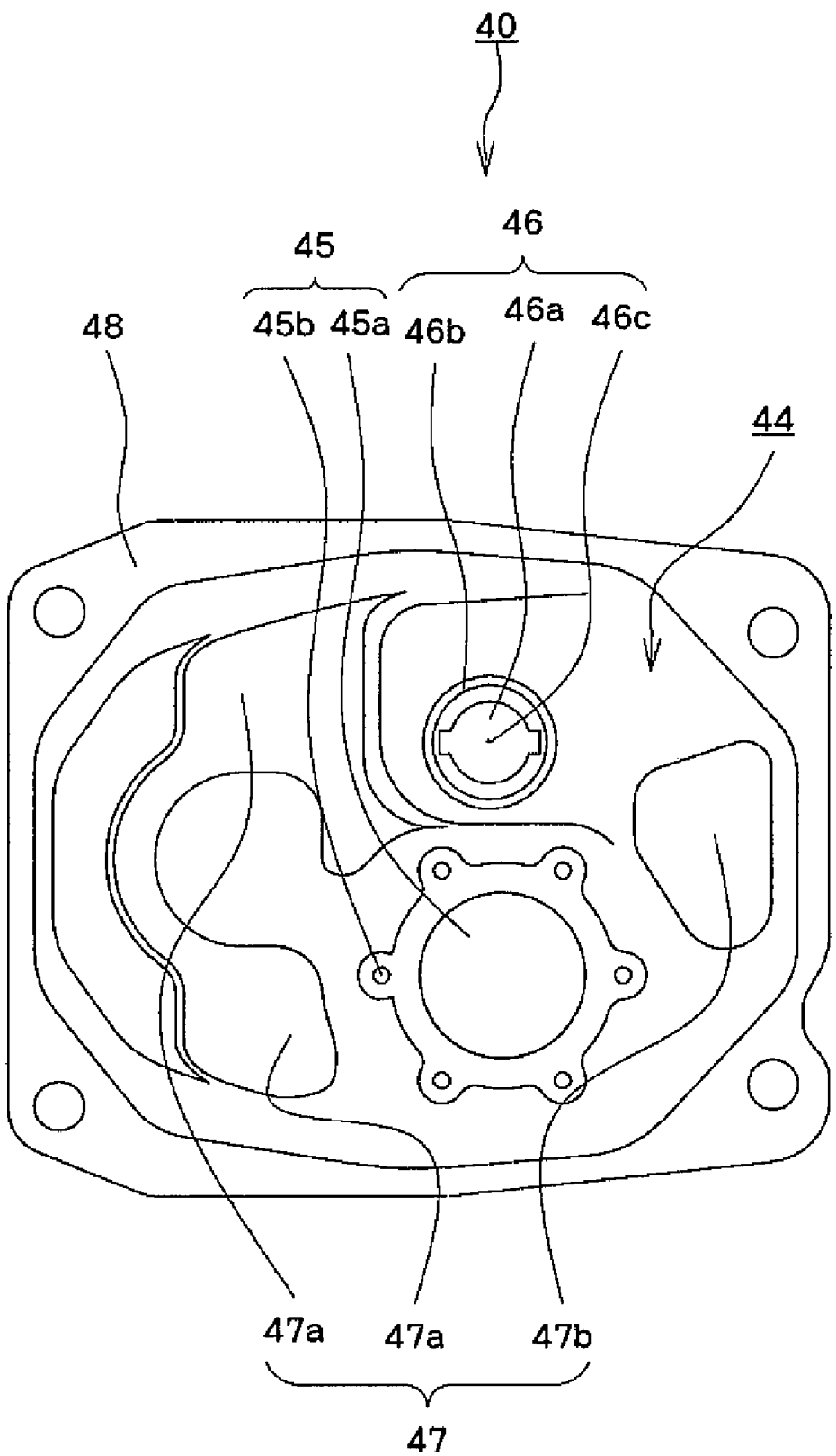
FIG. 7 is a plan view of a fuel tank according to the embodiment of the invention.
Figure 8:
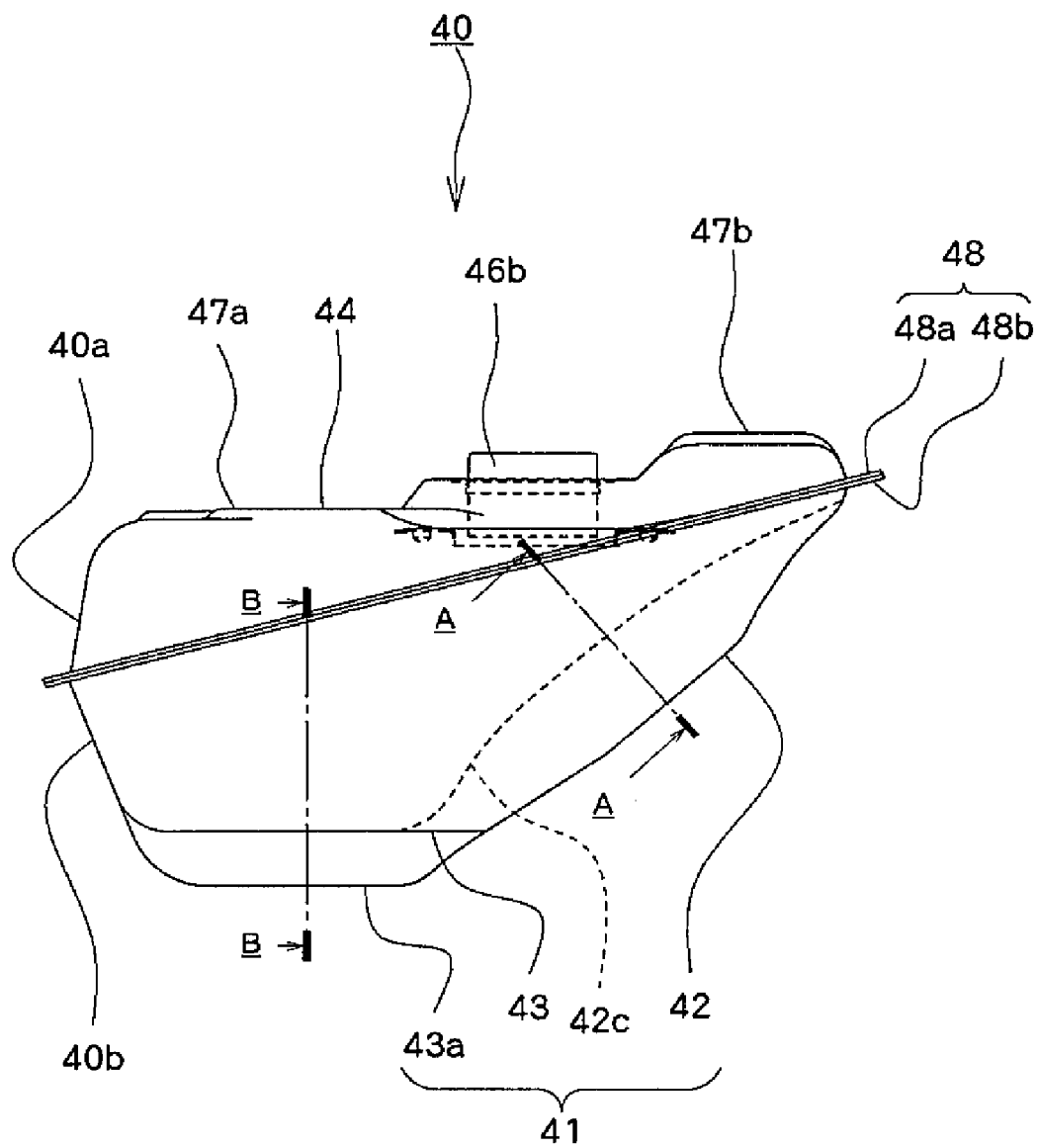
FIG. 8 is a left side view of the fuel tank of FIG. 7.
Figure 9:
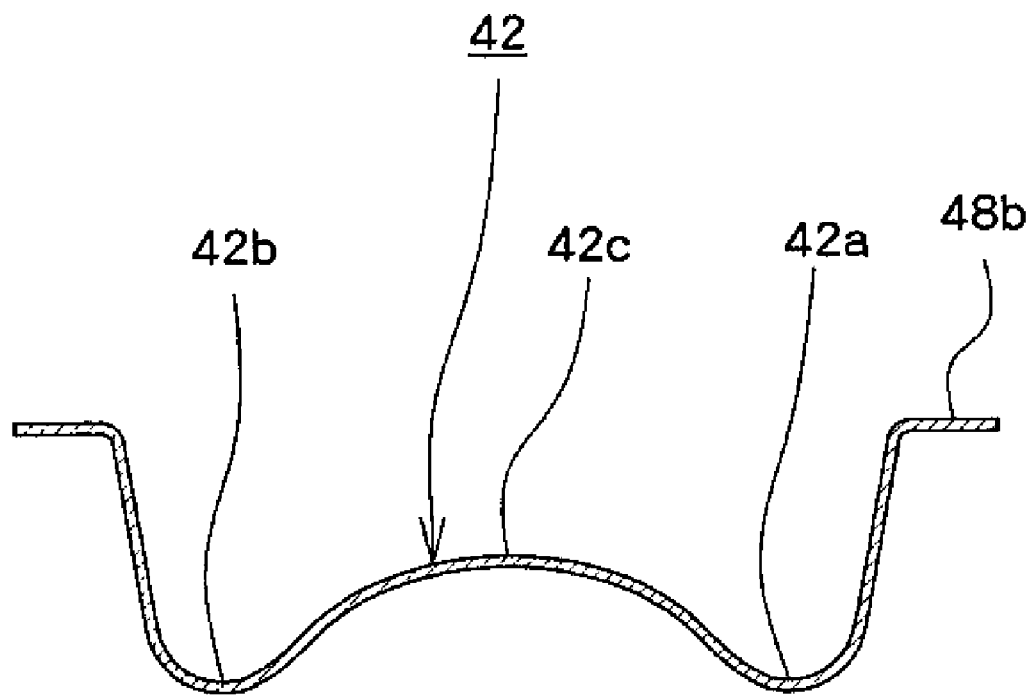
FIG. 9 is a cross-sectional view of the bottom of the fuel tank taken along line A-A of FIG. 8.
Figure 10:
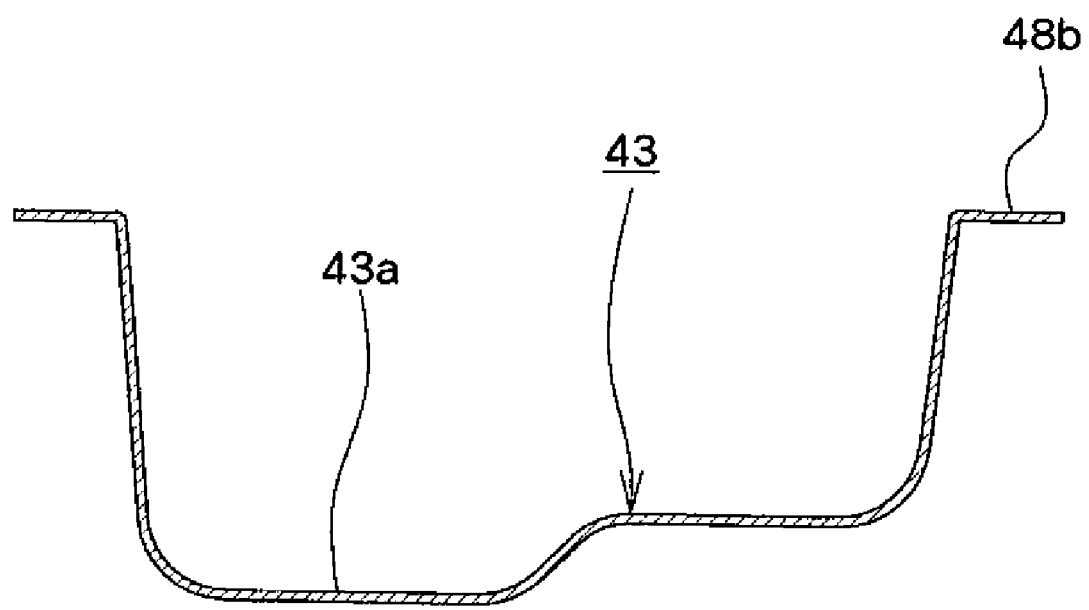
FIG. 10 is a cross-sectional view of the bottom of the fuel tank taken along line B-B of FIG. 8.
Figure 11:
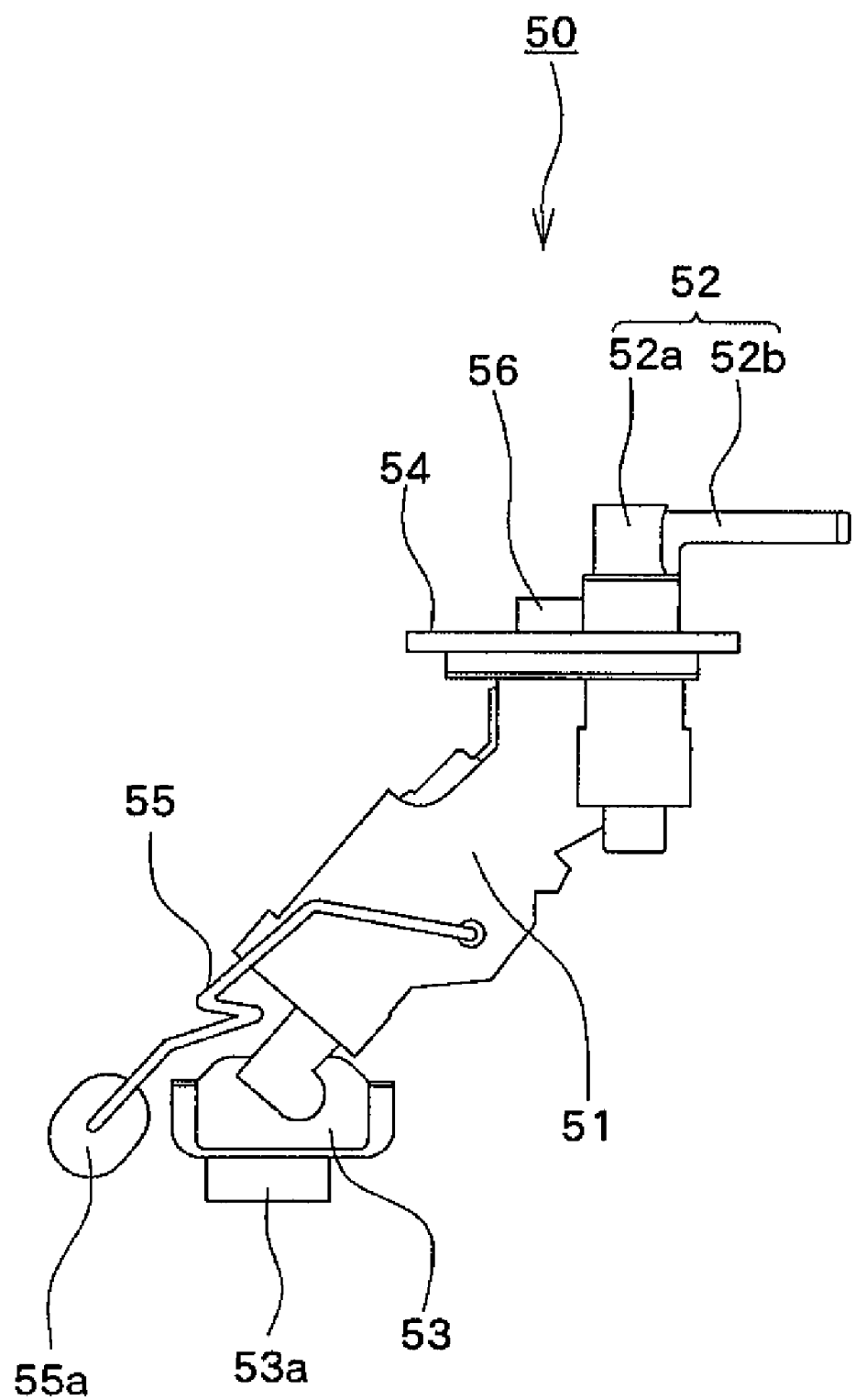
FIG. 11 is a left side view of a fuel pump unit according to the embodiment of the invention.
Figure 12:
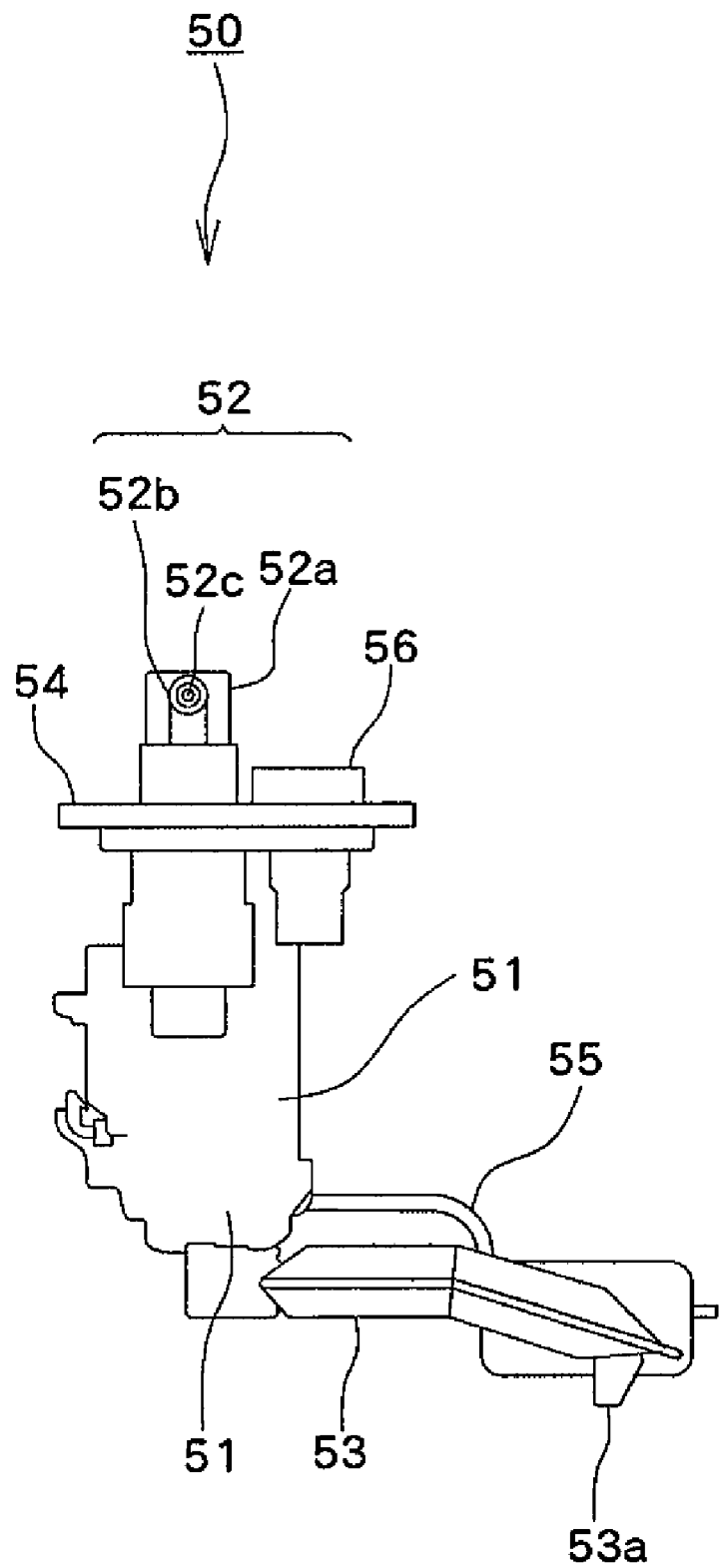
FIG. 12 is a back view of the fuel pump unit of FIG. 11.

Fuel-tank assembly 200 is now described in detail. FIG. 4 is a perspective view of fuel-tank assembly 200 mounted to the body and shows a state in which seat 20, battery case 80, tank cover 60, protective member 70, body cover 100, and so on are removed for convenience of description. FIG. 5 is a perspective view of the body in FIG. 4, to which tank cover 60 is disposed. FIG. 6 is a left side view of fuel-tank assembly 200. FIGS. 7 and 8 are, respectively, a plan view and a left side view of fuel tank 40. FIGS. 9 and 10 are cross-sectional views of a bottom 41 of fuel tank 40 taken, respectively, along line A-A and line B-B of FIG. 8. FIGS. 11 and 12 are, respectively, a left side view and a back view of fuel pump unit 50.

Fuel tank 40 of fuel-tank assembly 200 has bottom 41 that is the lower part of its outside wall and an upper surface 44 that is the upper part of the outside wall. Fuel tank 40 also has a plate collar 48 surrounding the outer side. Fuel tank 40 is assembled such that an upper part 40a and a lower part 40b which are formed separately are fixed together by fixing a collar 48a of upper part 40a and a collar 48b of lower part 40b to each other. Collar 48 is inclined to the lower front in the front-rear direction along a left seat rail 14a and a right seat rail 14b.

Bottom 41 of fuel tank 40 includes a rear part 42 (hereinafter, referred to as an inclined part 42) extending from the rear end of upper surface 44 toward the lower front. Inclined part 42 is disposed above the front of rear wheel 3 and rear fender 4 with respect to rotation shaft 3a of rear wheel 3.

Inclined part 42 is curved in the width direction and the front-rear direction so as to cover an upper surface 3b of rear wheel 3 and an upper surface 4a of rear fender 4 disposed therebelow (see FIG. 2). In other words, inclined part 42 is shaped like a saddle that is curved across rear wheel 3 and rear fender 4 therebelow in the width direction. As shown in FIG. 9, the width-direction center part 42c of inclined part 42 rises along the curve in the width direction of upper surface 3b of rear wheel 3 and upper surface 4a of rear fender 4(see FIG. 2) disposed below inclined part 42. Inclined part 42 also has a left downward recess 42a and a right downward recess 42b on the left and right ends in the width direction. Inclined part 42 is therefore disposed along rear-fender upper surface 4a in such a manner that width-direction center part 42c covers the upper part of rear-fender upper surface 4a and that left recess 42a and right recess 42b sandwich rear-fender upper surface 4a from the left and right sides in the width direction.

Referring to FIG. 8, width-direction center part 42c of inclined part 42 is curved in the front-rear direction along the curve of rear-wheel upper surface 3b and rear-fender upper surface 4a below inclined part 42 so as to cover rear-wheel upper surface 3b and rear-fender upper surface 4a. Inclined part 42 is thus disposed along and covers rear-fender upper surface 4a in the front-rear direction. In this manner, inclined part 42 is curved to cover rear-fender upper surface 4a in the width and front-rear directions, so that inclined part 42 can be disposed close to rear-fender upper surface 4a (see FIG. 2). There is no other component disposed between inclined part 42 and rear-fender upper surface 4a facing inclined part 42.

Bottom 41 of fuel tank 40 further includes a part 43 (hereinafter, referred to as an extending part 43) whose rear end connects to the lower end of inclined part 42 and extends substantially horizontally forward from the lower end of inclined part 42. Extending part 43 is disposed at the lowest position of bottom 41, forward with respect to rear wheel 3 and below the rear part of first seat portion 21 of seat 20.

Of extending part 43, the right part in the width direction is recessed downward from the left to form a reservoir 43a at the lowest part of extending part 43. Accordingly, for example, when fuel is stored in fuel tank 40, the height from reservoir 43a to the fuel level thereabove is larger than the height from the other part of bottom 41 (including the part of extending part 43 except reservoir 43a and inclined part 42) to the fuel level thereabove, so that fuel left in fuel tank 40 is stored in reservoir 43a.

Thus, fuel tank 40 has a high part above extending part 43 to ensure sufficient capacity and a low part above inclined part 42 which can be disposed in the limited space above rear wheel 3 and under seat 20.

Fuel tank 40 also has a front protrusion 47a and a rear protrusion 47b of upper surface 44 on which front load receiving section 90 and rear load receiving section 91 are disposed and which rise from the peripheral surface to the side facing seat 20. Front protrusion 47a is the part of the front of upper surface 44 which rises in the width direction from the part in contact with right-front load receiving section 90b across the part in contact with left-front load receiving section 90a. Rear protrusion 47b is the part of the rear of upper surface 44 which rises in the center of the width in contact with the lower end of rear load receiving section 91.

Front protrusion 47a and rear protrusion 47b rise to have the highest rigidity of upper surface 44. Front protrusion 47a receives a load on first seat portion 21 through front load receiving section 90, while rear protrusion 47b receives a load on second seat portion 22 through rear load receiving section 91. The upper surfaces of front protrusion 47a and rear protrusion 47b are substantially flat to allow close contact with front load receiving section 90 and rear load receiving section 91. The upper surface of rear protrusion 47b is located at the highest position of the surface of fuel tank 40.

Fuel tank 40 has at upper surface 44 a pump mounting section 45 at which discharge section 52 of fuel pump unit 50 is disposed. Of pump mounting section 45, the part above left recess 42a of inclined part 42 (see FIG. 9) has a circular pump-insertion opening 45a through which part of fuel pump unit 50 is inserted into fuel tank 40. Discharge section 52 of fuel pump unit 50 is disposed within the range of pump-insertion opening 45a. A plurality of fixing holes 45b for bolts 320 (see FIG. 6) for fixing part of fuel pump unit 50 to upper surface 44 are formed around pump-insertion opening 45a.

Fuel tank 40 has a fuel supply port 46 on upper surface 44, which has a substantially circular fuel injection opening 46a for injecting fuel into fuel tank 40. Fuel supply port 46 further has a vertically extending cylindrical tube filler 46b passed through fuel injection opening 46a and fixed to upper surface 44. The upper end of tube filler 46b projects upward from the peripheral upper surface 44, while the lower end thereof extends vertically into fuel tank 40.

The upper surface of fuel supply port 46 is located higher than the upper surface of discharge section 52 of fuel pump unit 50. Specifically, fuel-tank assembly 200 shown in FIG. 6 is constructed such that fuel supply port 46 has a cap 46d protruding from upper surface 44 to cover the top of tube filler 46b. The top face of cap 46d is located higher than a projection 52a and a nozzle 52b of discharge section 52. Accordingly, projection 52a and nozzle 52b are effectively protected from deflection of seat 20 by fuel supply port 46 having a relatively high rigidity.

Fuel supply port 46 is disposed between left-front load receiving section 90a and right-front load receiving section 90b in the width direction. Specifically, referring to FIG. 3, fuel supply port 46 is disposed such that center 46c of fuel injection opening 46a is located between a phantom line 90d drawn from the left end of left-front load receiving section 90a in the width direction to the rear and a phantom line 90c drawn from the right end of right-front load receiving section 90b in the width direction to the rear.

Fuel, supply port 46 and pump mounting section 45 are disposed behind front protrusion 47a and forward of rear protrusion 47b. Specifically, fuel supply port 46 and pump mounting section 45 are disposed behind a phantom line 90f drawn from the front end of front load receiving section 90 in the width direction and forward of a phantom line 90g drawn from the rear end of rear load receiving section 91 in the width direction. Fuel supply port 46 and pump mounting section 45 are arranged side by side in the width direction and, respectively, behind right-front load receiving section 90b and left-front load receiving section 90a.

Fuel pump unit 50 includes a body 51 for generating power for taking fuel out from tank 40; an intake section 53 for taking fuel in tank 40 into body 51, a discharge section 52 for discharging fuel taken in body 51 outside fuel tank 40, a disc flange 54 fixed to tank 40, and a fuel gauge 55 for measuring the amount of fuel in fuel tank 40.

Body 51 has a substantially cylindrical shape extending to the lower front from the lower part of discharge section 52, and accommodates a motor shaft (not shown) extending longitudinally, an impeller (not shown) rotatable around the motor shaft for sucking fuel from intake section 53, and a motor (not shown) for generating power to rotate the impeller.

In fuel-tank assembly 200, body 51 is disposed on and close to inclined part 42 in such a manner that its length substantially agrees with the direction of inclination of inclined part 42. The direction of inclination of inclined part 42 is, for example, the direction of the tangential line of part of inclined part 42 to the curve in the front-rear direction, Specifically, for example, body 51 is disposed on inclined part 42 in such a manner that the longitudinal direction of the motor shaft substantially agrees with the tangential line of the width-direction center part 42c of inclined part 42 in the front-rear direction to the curve. Accordingly, for example, an impact on the longitudinal direction of the motor shaft in body 51 with the vertical vibration of the body is reduced as compared with the case when body 51 is erected vertically. The length of inclined part 42 in the direction of inclination is larger than the length of body 51.

In fuel-tank assembly 200, body 51. of fuel pump unit 50 is disposed on the lowest portion of inclined part 42 of fuel tank 40. Specifically, body 51 is disposed on left recess 42a (see FIG. 9) of inclined part 42. In this case, at least part of body 51 may be disposed lower than width-direction center part 42c of inclined part 42.

Disposing body 51 which is the longest part in the longitudinal direction in fuel pump unit 50 with tilt along inclined part 42 of fuel tank 40 reduces the thickness of fuel-tank assembly 200 above inclined part 42. This enables the rear part of fuel-tank assembly 200 to be disposed in the limited space above rear wheel 3 and under seat 20.

Intake section 53 of fuel pump unit 50 has a filter (not shown) for filtering fuel in fuel tank 40 to eliminate dust and other debris from the fuel when sucking the fuel into body 51.

Intake section 53 is connected to the lower end of body 51, and extends downward from the lower end of body 51, and also extends to the right in the width direction, the end 53a of which is bent obliquely downward.

Intake section 53 is disposed on extending part 43 in such a manner that end 53a is located above reservoir 43a of extending part 43. Intake section 53 is disposed close to extending part 43 with a slight distance therefrom.

Discharge section 52 of is disposed above the upper end of body 51. Fuel pump unit 50 extends upward from the upper end of body 51 to discharge section 52 toward seat 20. Projection 52a projects from flange 54 and cylindrical nozzle 52b extends substantially horizontally from projection 52a toward the rear. The end of nozzle 52b has a discharge opening 52c for discharging fuel, to which one end of fuel hose 201 is connected (see FIG. 2).

Discharge section 52 projects within the range of pump-insertion opening 45a of upper surface 44 of fuel tank 40 facing seat 20. As a result, discharge section 52 is located rearward of first seat portion 21. Discharge section 52 is located below intermediate part 23, which is between first seat portion 21 and second seat portion 22. Specifically, as shown in FIG. 3, projection 52a and nozzle 52b are located behind phantom line 90f drawn from the front end of front load receiving section 90 in the width direction and forward of phantom line 90g drawn from the rear end of rear load receiving section 91 in the width direction.

As a result, discharge section 52 is located in the space below seat 20 and above fuel tank 40 and between front load receiving section 90 and rear load receiving section 91 above rear wheel 3 and rear fender 4. Accordingly, even when a driver is seated in first seat portion 21 and a passenger is seated in second seat portion 22, first seat portion 21 is deflected between front load receiving section 90 and front support section 92, while second seat portion 22 is deflected between rear load receiving section 91 and rear support section 93, so that discharge section 52 is effectively protected from the deflection of seat 20.

Discharge section 52 is disposed between left and right front load receiving sections 90a and 90b in the width direction. Specifically, as shown in FIG. 3, projection 52a and nozzle 52b of discharge section 52 are located between phantom line 90d drawn from the left end of left-front load receiving section 90a in the width direction to the rear and phantom line 90e drawn from the right end of right-front load receiving section 90b in the width direction to the rear. Accordingly, discharge section 52 is effectively protected from displacement of seat 20 due to a load.

Projection 52a and nozzle 52b and fuel hose 201 extending from nozzle 52b to the rear are disposed lower than the upper surface of rear protrusion 47b of fuel tank 40. Nozzle 52b and fuel hose 201 extend to the left of rear protrusion 47b. The Projection 52a, nozzle 52b, and fuel hose 201 are disposed higher than any part of upper surface 44 other than rear protrusion 47b (including front protrusion 47a).

Flange 54 of fuel pump unit 50, on the upper end of body 51, extends from the lower end of projection 52a of discharge section 52 in a disc form to the periphery. Flange 54 has a projecting connector 56 adjacent to projection 52a, and connector 56 has a terminal (not shown) for supplying power from the generator (not shown) of motorcycle 1 to fuel pump unit 50.

Flange 54 is disposed on pump-insertion opening 45a and pushed from above by a presser 321 against part of pump mounting section 45 surrounding pump-insertion opening 45a. Flange 54 is tightened to pump mounting section 45 together with presser 321 by bolts 320. Connector 56 on flange 54 is capped with a terminal coupler 57, from which a power supply harness 58 connected to the terminal of connector 56 extends to the left in the width direction (see FIG. 4). Connector 56 is also disposed between left and right front load receiving sections 90a and 90b in the width direction, as is discharge section 52.

Fuel gauge 55 of fuel pump unit 50 has a float 55a floatable in the fuel in tank 40. Fuel gauge 55 measures the fuel level on the basis of the position of float 55a, which floats up and down according to the level of fuel in fuel tank 40.

The angle defined by the longitudinal direction of discharge section 52 and the longitudinal direction of body 51 of fuel pump unit 50 is fixed. In other words, discharge section 52 and body 51 are connected to each other such that the angle 5 formed between the vertical direction of discharge section 52 and the direction of inclination of body 51 is constant.

Fuel-tank assembly 200 is assembled such that fuel pump unit 50 is inserted from its lower end into fuel tank 40, and part of fuel pump unit 50 is fixed to fuel tank 40. Specifically, fuel pump unit 50 is inserted from the side of intake section 53 into fuel tank 40 through pump-insertion opening 45a. Intake section 53 and body 51 are slid obliquely downward along the inclination of inclined part 42 located below pump-insertion opening 45a. Thus, intake section 53 is disposed on extending part 43 at the lowest part of bottom 41 of fuel tank 40, while body 51 extends along the inclination of inclined part 42. Flange 54 is tightened to part of pump mounting section 45 surrounding pump-insertion opening 45a, on the upper end of body 51 with bolts 320 to thereby fix fuel pump unit 50 to fuel tank 40. As a result, only part of fuel pump unit 50, intake section 53 and part of fuel gauge 55, are disposed on extending part 43, and the other parts, including body 51, flange 54, and discharge section 52, are disposed on inclined part 42.

Fuel-tank assembly 200 is fixed to left and right seat rails 14. Specifically, a left front stay 300 and a left rear stay 301 are fixed to left seat rail 14a to support the left side of fuel tank 40 at the front and rear, while a right front stay 302 and a right rear stay 303 are fixed to right seat rail 14b at the front and rear. Collar 48 of fuel tank 40 is fixed to the four stays, so that fuel-tank assembly 200 is secured to and between left seat rail 14a and right seat rail 14b.

Tank cover 60 is a rubber sheet formed along the shape of and covering upper surface 44 of fuel tank 40. Tank cover 60 covers the top face of most of the part of fuel-tank assembly 200 disposed above seat rails 14 except fuel supply port 46, rear protrusion 47b, the rear end of fuel tank 40, and discharge section 52 of fuel pump unit 50. Tank cover 60 has right and left fins 61 that cover parts of seat rails 14a and 14b that are disposed outside fuel tank 40 in the width direction. Tank cover 60 prevents fuel that spills from tank 40 from flowing below tank 40. Tank cover 60 has a plate weir 62 (FIG. 5) extending in the front-rear direction to separate fuel supply port 46 of fuel tank 40 from discharge section 52 of fuel pump unit 50. Thus, weir 62 prevents fuel that spills around fuel supply port 46 from flowing toward discharge section 52. As has been described, the part of tank cover 60 that covers front protrusion 47a of fuel tank 40 has left and right front load receiving sections 90a and 90b projecting together with the other part to seat 20.

Figure 13:
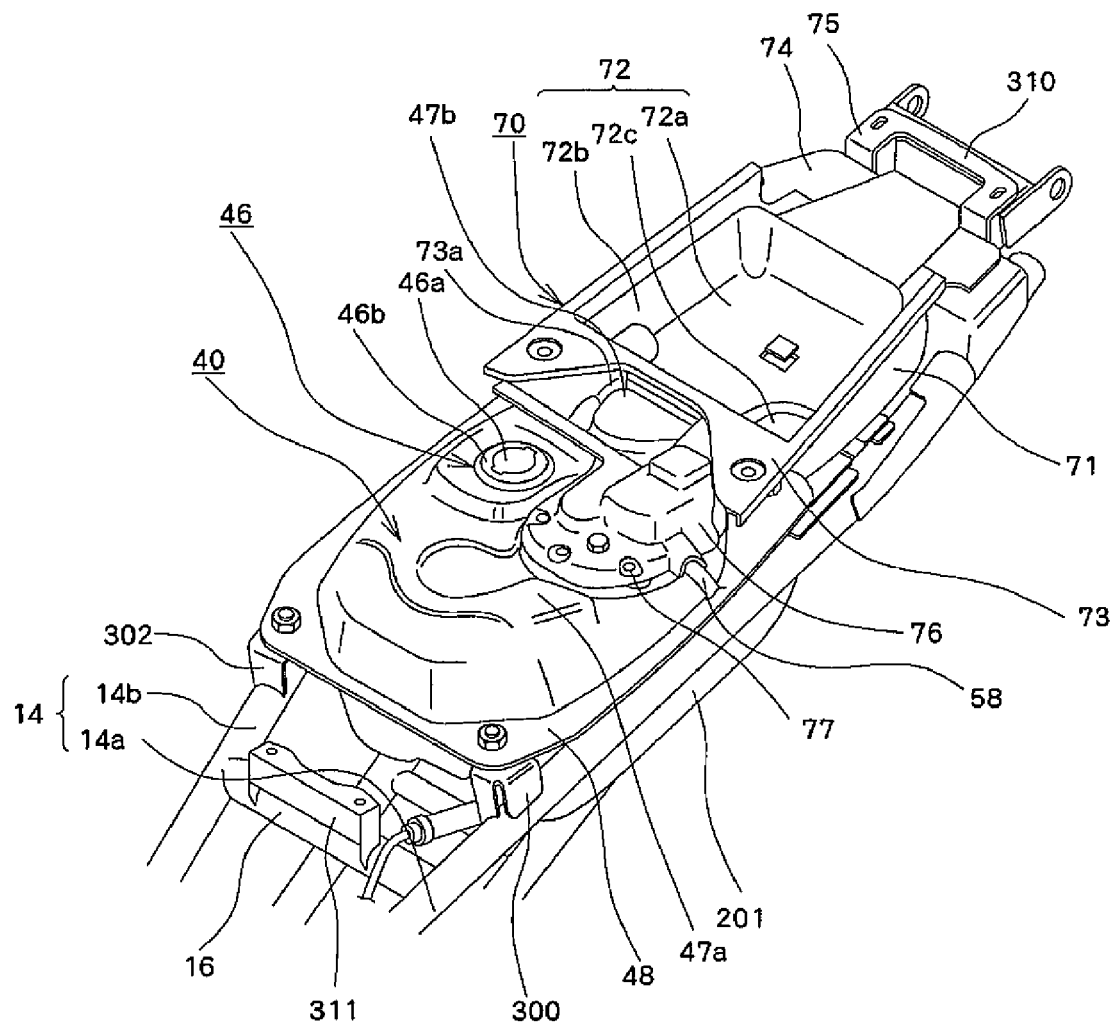
FIG. 13 is a perspective view of the vehicle body of FIG. 4 with a protective member.
Figure 14:
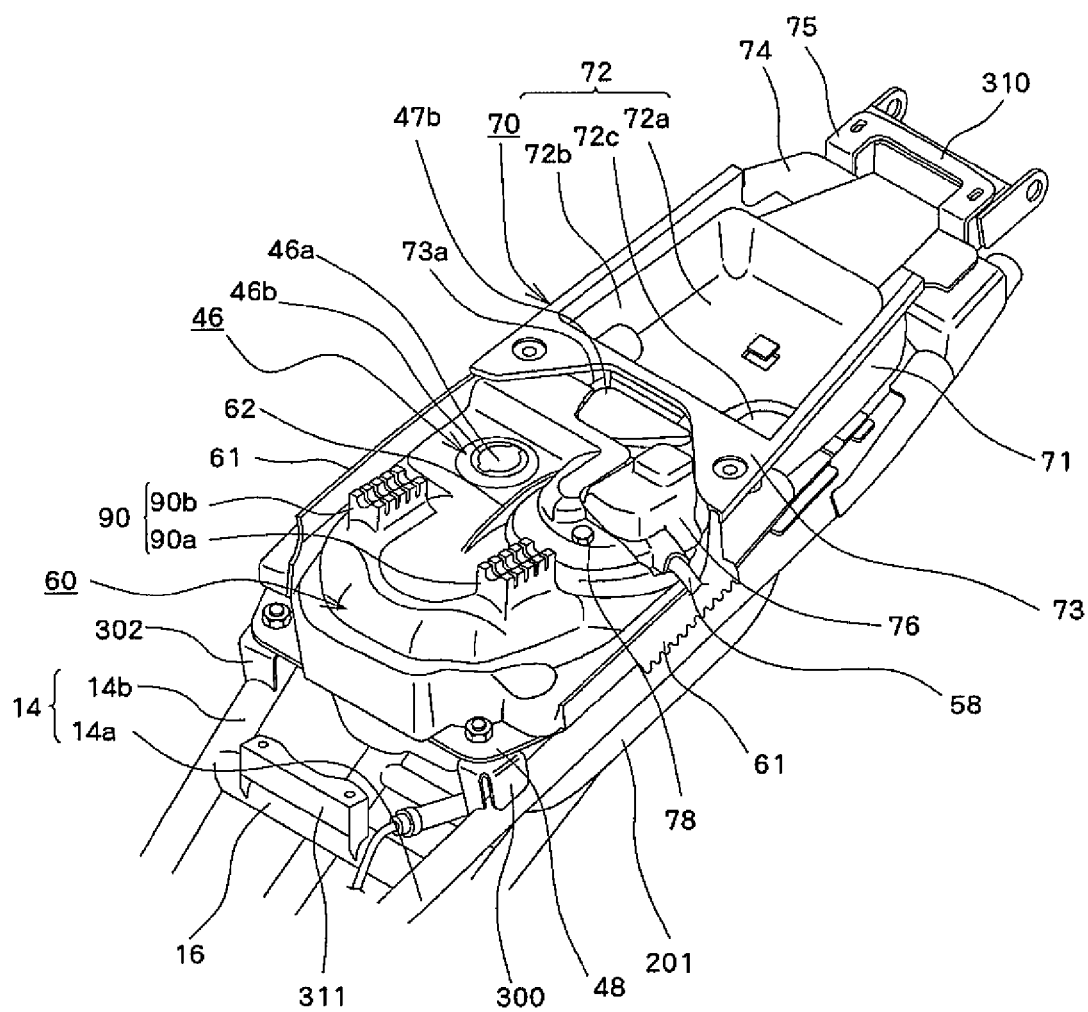
FIG. 14 is a perspective view of the vehicle body of FIG. 5 with the protective member.
Figure 15:
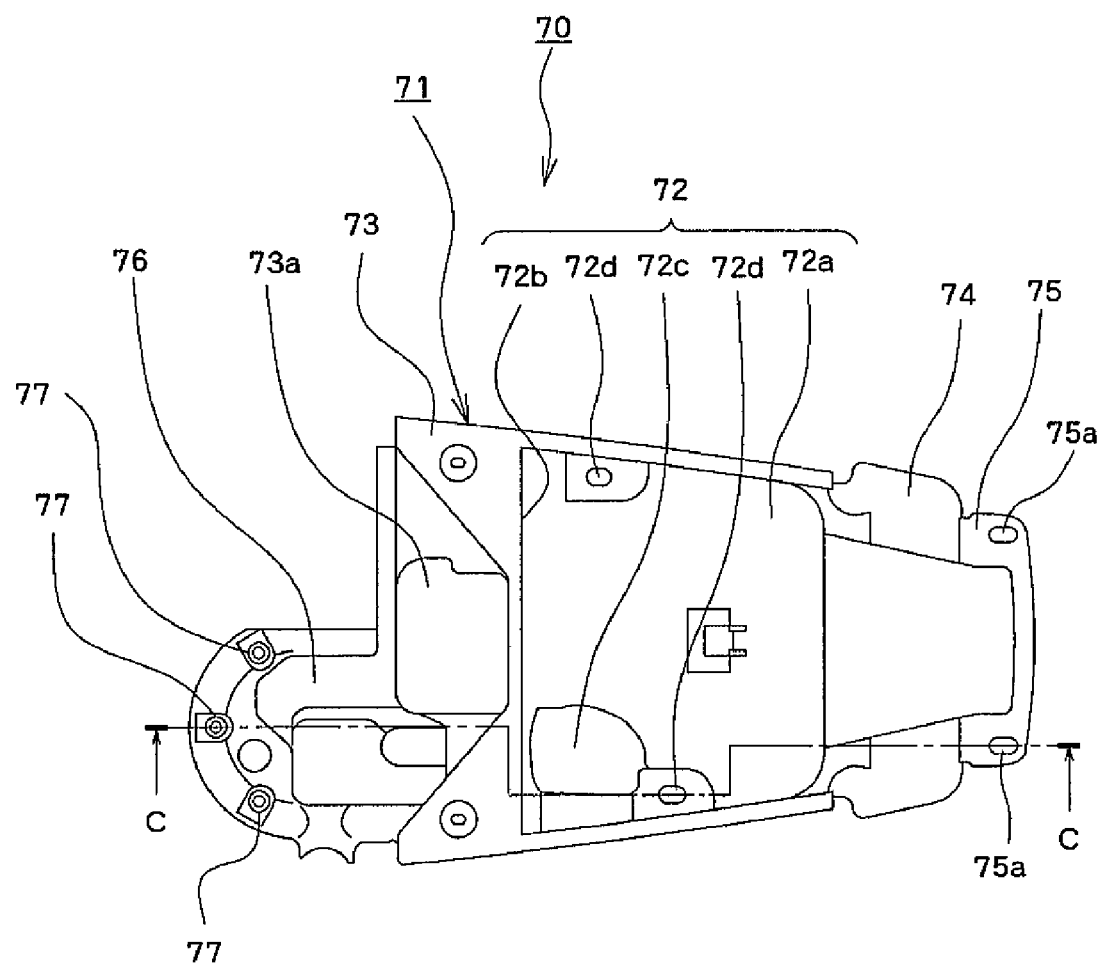
FIG. 15 is a plan view of the protective member according to the embodiment of the invention.
Figure 16:
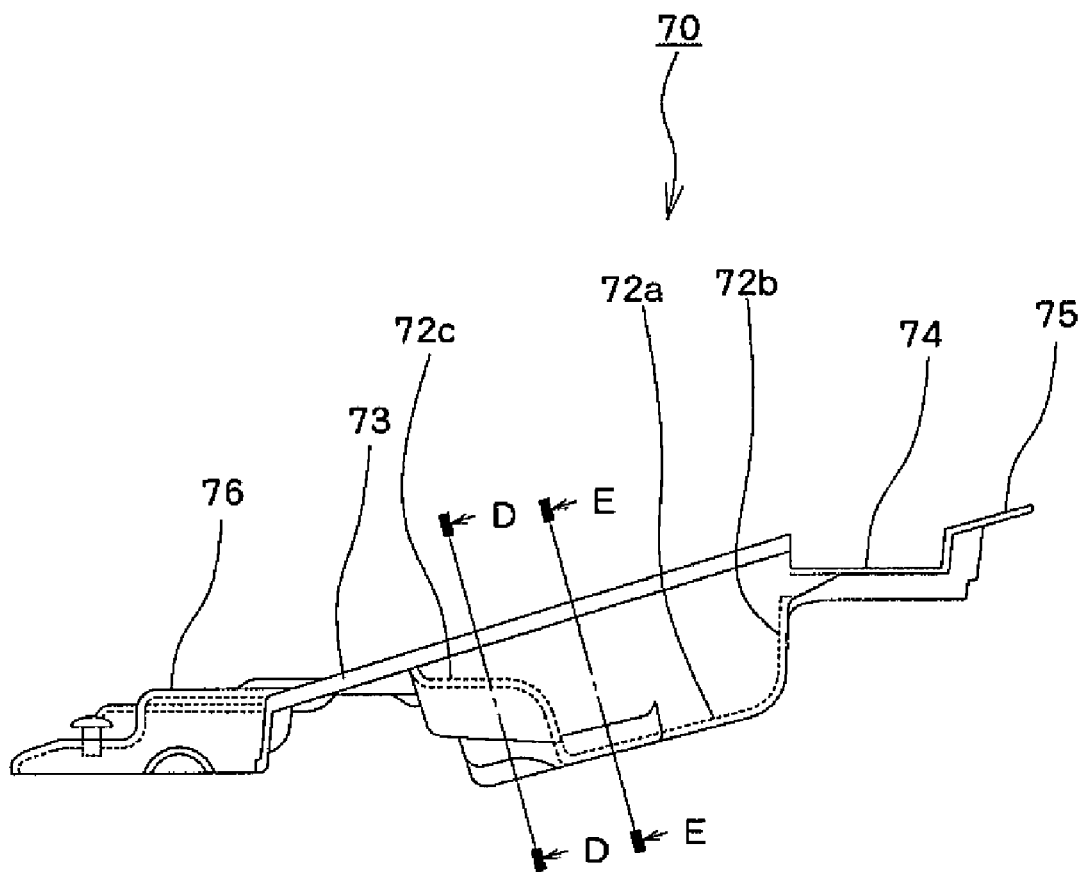
FIG. 16 is a left side view of the protective member of FIG. 15.
Figure 17:
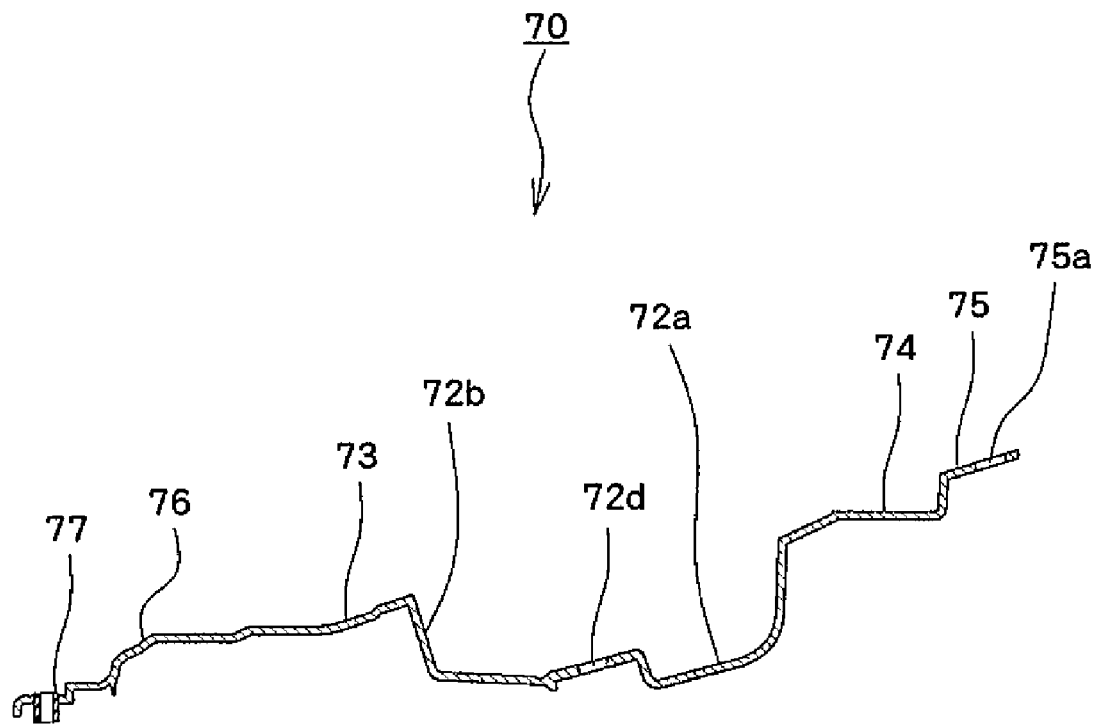
FIG. 17 is a cross-sectional view of the protective member taken along line C-C of FIG. 15.
Figure 18:
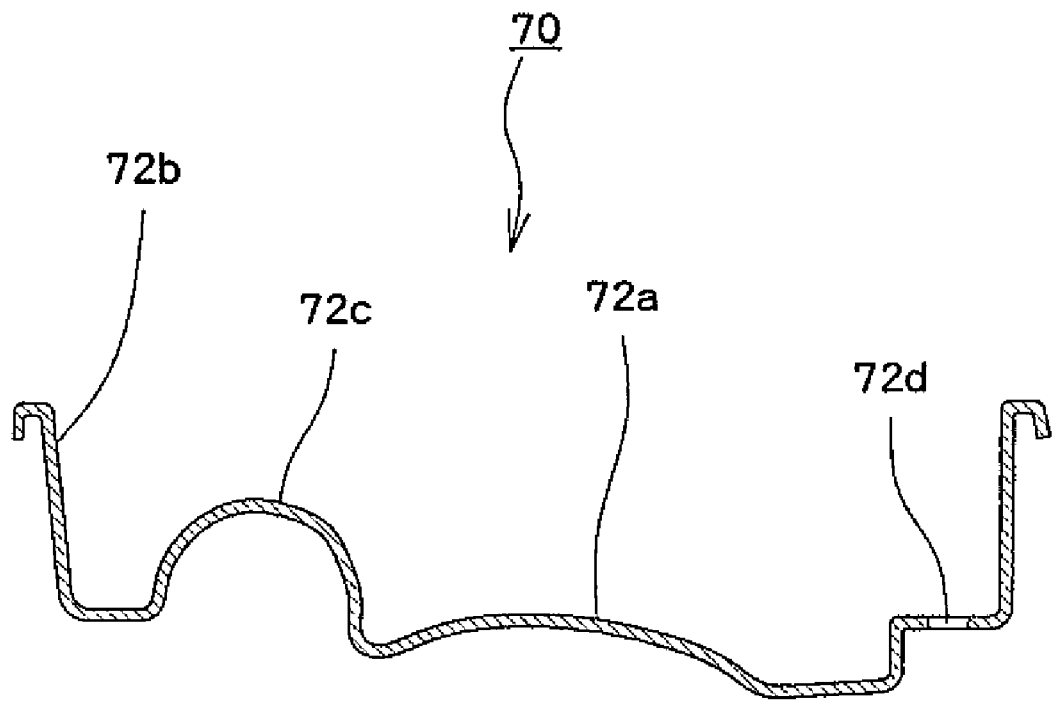
FIG. 18 is a cross-sectional view of the protective member taken along line D-D of FIG. 16.
Figure 19:
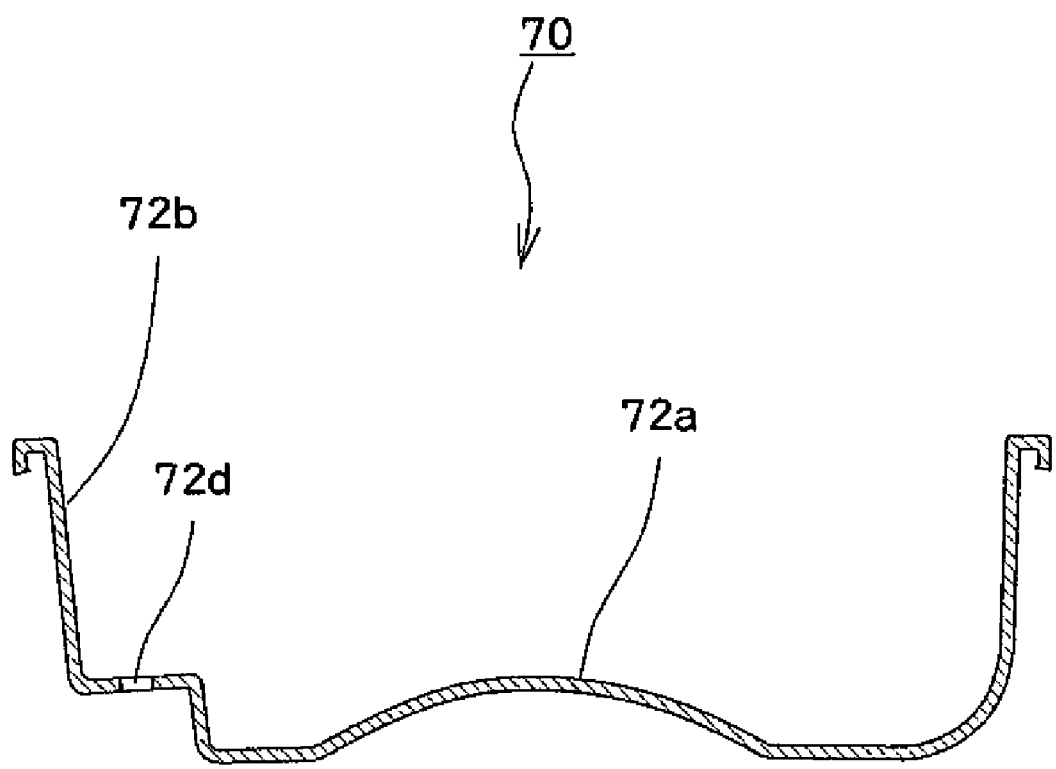
FIG. 19 is a cross-sectional view of the protective member taken along line E-E of FIG. 16.

Protective member 70 is now described in detail. FIG. 13 is a perspective view of the vehicle body of FIG. 4 with protective member 70; FIG. 14 is a perspective view of the vehicle body of FIG. 5 with protective member 70; FIGS. 15 and 16 are plan and left side views, respectively, of protective member 70; FIG. 17 is a cross-sectional view of protective member 70 taken along line C-C of FIG. 15; and FIGS. 18 and 19 are cross-sectional views of protective member 70 taken, respectively, along line D-D and line E-E of FIG. 16.

The whole protective member 70 is made of resin, and includes a base 71 fixed to left seat rail 14a and right seat rail 14b and a pump cover 76 integrated with base 71 and covering discharge section 52 on fuel tank 40.

Base 71 is a storage box having a downwardly recessed storage section 72. Storage section 72 includes an article storage bottom 72a and a storage wall 72b extending upward from storage bottom 72a to surround storage bottom 72a. Storage bottom 72a is inclined to the lower front along left seat rail 14a and right seat rail 14b in the front-rear direction. The width of storage bottom 72a is substantially equal to the distance between left seat rail 14a and right seat rail 14b. Storage bottom 72a has a pair of left and right fixing holes 72d for fixing base 71 to left and right seat rails 14a and 14b at the right and left ends in the width direction.

Base 71 has a rear plate 74 extending from the upper end of the rear of storage wall 72b toward the rear. As shown in FIGS. 2 and 3, rear plate 74 is in contact with rear support section 93 from above, rear support section 93 projecting from the lower surface of seat 20. Thus, rear plate 74 receives part of a load on seat 20 via rear support section 93.

Base 71 further has a rear plate 75 extending from the rear end of rear plate 74 toward the rear. The width of rear plate 75 is substantially equal to the distance between the rear ends of left and right seat rails 14a and 14b. The left and right ends of rear plate 75 have a pair of left and right fixing holes 75a for fixing base 71 to left seat rail 14a and right seat rail 14b.

Base 71 is disposed across seat rails 14a and 14b in the width direction. Both ends of base 71 in the width direction are fixed to seat rails 14a and 14b. Specifically, as shown in FIGS. 4 and 5, left seat rail 14a fixes to a left rear stay 304 behind left rear stay 301 on the back of fuel tank 40, while right seat rail 14b fixes to a right rear stay 303. Storage bottom 72a of base 71 is secured at left and right ends in the width direction to left rear stay 304 and right rear stay 303 with two bolts 72e (see FIG. 2) passed through fixing holes 72d. Thus, base 71 is secured to seat rails 14a and 14b through rear stays 304 and 303.

A rear-end support member 310 is fixed at both ends across the rear ends of seat rails 14a and 14b. Rear plate 75 of base 71 is fixed at right and left ends in the width direction to rear-end support member 310 with two bolts 75b (see FIG. 2) passed through fixing holes 75a. Thus, base 71 is fixed to seat rails 14a and 14b through rear-end support member 310. Base 71 is thus disposed across seat rails 14a and 14b in the width direction. In this way, base 71 is disposed close to and behind fuel tank 40.

Base 71 further has a hose cover 72c which is part of storage bottom 72a and storage wall 72b and which extends inside storage section 72 to cover folded part 201a of fuel hose 201 extending toward the back of fuel tank 40. Folded part 201a is folded back to the front at the rear end of fuel tank 40. Hose cover 72c projects from the front of storage wall 72b to the rear so as to follow folded part 201a of fuel hose 201. Folded part 201a is disposed outside hose cover 72c to extend along the projection of hose cover 72c. Since hose cover 72c for protecting folded part 201a of fuel hose 201 projects into part of the storage space of storage section 72, the number of components can be decreased, and motorcycle 1 can be reduced in size in the front-rear direction.

Fuel hose 201 is folded forward to roll in the rear end of collar 48 of fuel tank 40 from above to below, and extends forward along the left side of fuel tank 40 between seat rails 14 and backstays 13. In other words, fuel hose 201 extends from discharge section 52 of fuel-tank assembly 200 to injector 32 of engine 30 without sticking out of seat rails 14 to the exterior in the width direction. This allows size reduction of motorcycle 1 in the width direction.

Base 71 also has a front plate 73 extending from the upper end of the front of storage wall 72b toward the front. Front plate 73 extends to the lower front. The width of front plate 73 is substantially equal to the distance between seat rails 14a and 14b. Front plate 73 has, in the center in the width direction, an opening 73a in which rear protrusion 47b of fuel tank 40 adjacent to the front of base 71 is disposed. Specifically, as shown in FIGS. 13 and 14, rear protrusion 47b of fuel tank 40 is arranged to be exposed in opening 73a of front plate 73, so that rear load receiving section 91 projecting from the lower surface of seat 20 is in direct contact with rear protrusion 47b, as shown in FIG. 2.

The rear end of pump cover 76 of protective member 70 connects to the front end of front plate 73 and extends forward from the front end of front plate 73 substantially horizontally. Pump cover 76 is formed such that substantially the left half of front plate 73 in the width direction extends forward. In other words, pump cover 76 is integrated with front plate 73 and storage section 72 which are wider than the width of pump cover 76. Thus, an impact on pump cover 76 is efficiently dispersed to base 71 having front plate 73 and storage section 72.

Pump cover 76 has projections and depressions corresponding to the shapes of projection 52a and nozzle 52b of discharge section 52, fuel hose 201, terminal coupler 57, harness 58 disposed on fuel tank 40 and bolts 320 fixing flange 54 to upper surface 44, and is disposed in the vicinity of the upper side of these components to cover them. Pump cover 76 is secured to tank cover 60 with a screw 78.

A plurality of cylindrical bumpers 77 that can be in contact with the upper end of part of bolts 320 which fix flange 54 of fuel pump unit 50 to upper surface 44 of fuel tank 40 is disposed in the position of pump cover 76 facing the part of bolts 320. Bumpers 77 are disposed close to and above bolts 320 at a specified distance from opposing bolts 320 so as to come into contact with bolts 320. Bumpers 77 are made of rubber so that they can be elastically deformed by a smaller load than can resin pump cover 76. Accordingly, for example, even if pump cover 76 is deflected downward by an impact on pump cover 76, bumpers 77 come into contact with bolts 320 to thereby absorb the impact effectively. That is, bumpers 77 can reduce the impact on the periphery of the relatively low-rigidity pump-insertion opening 45a of upper surface 44 of fuel tank 40. Bumpers 77 may be in contact with opposing bolts 320 even if no impact is applied to pump cover 76.

Figure 20:
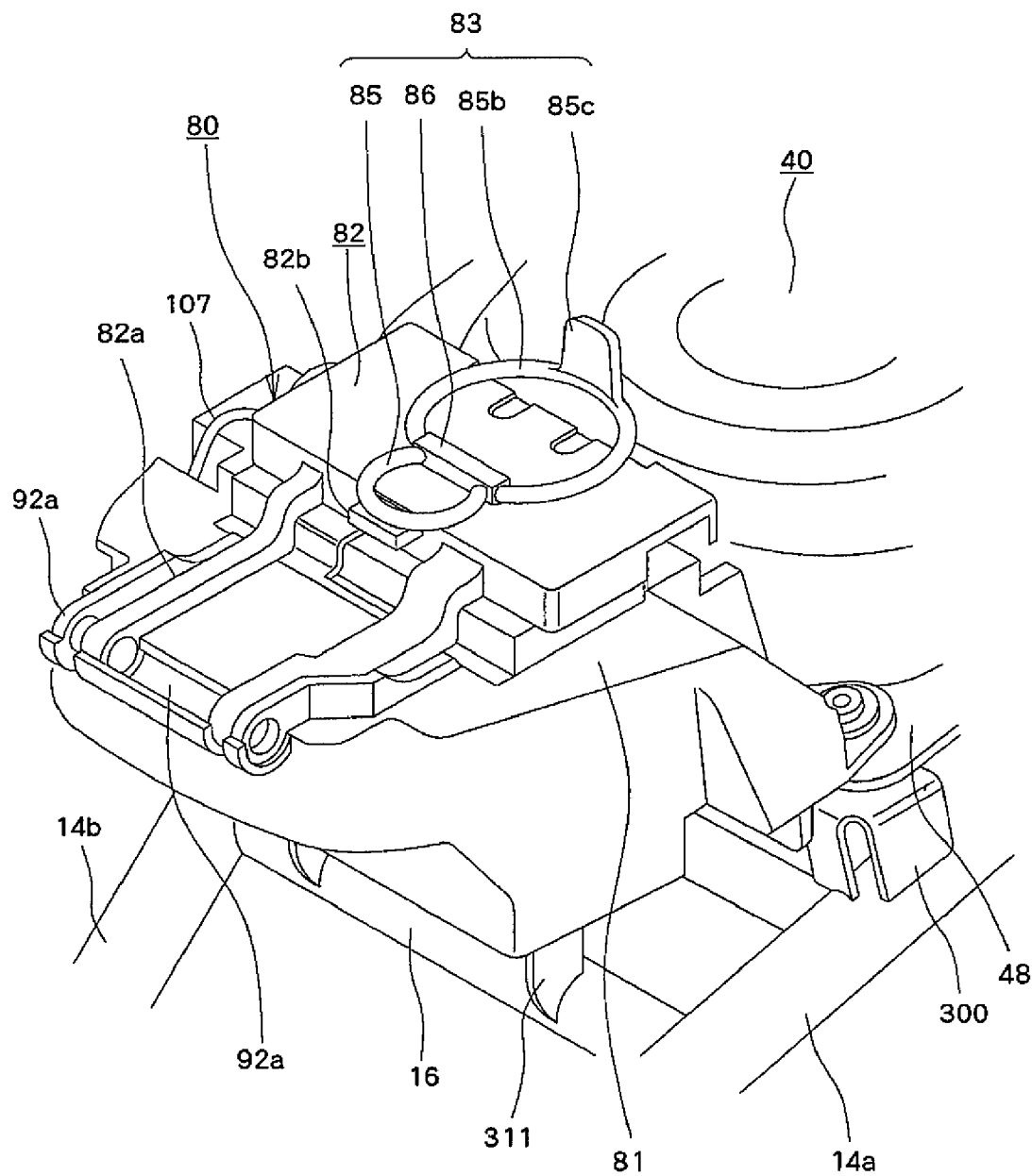
FIG. 20 is a perspective view of a battery case according to the embodiment of the invention.
Figure 21:
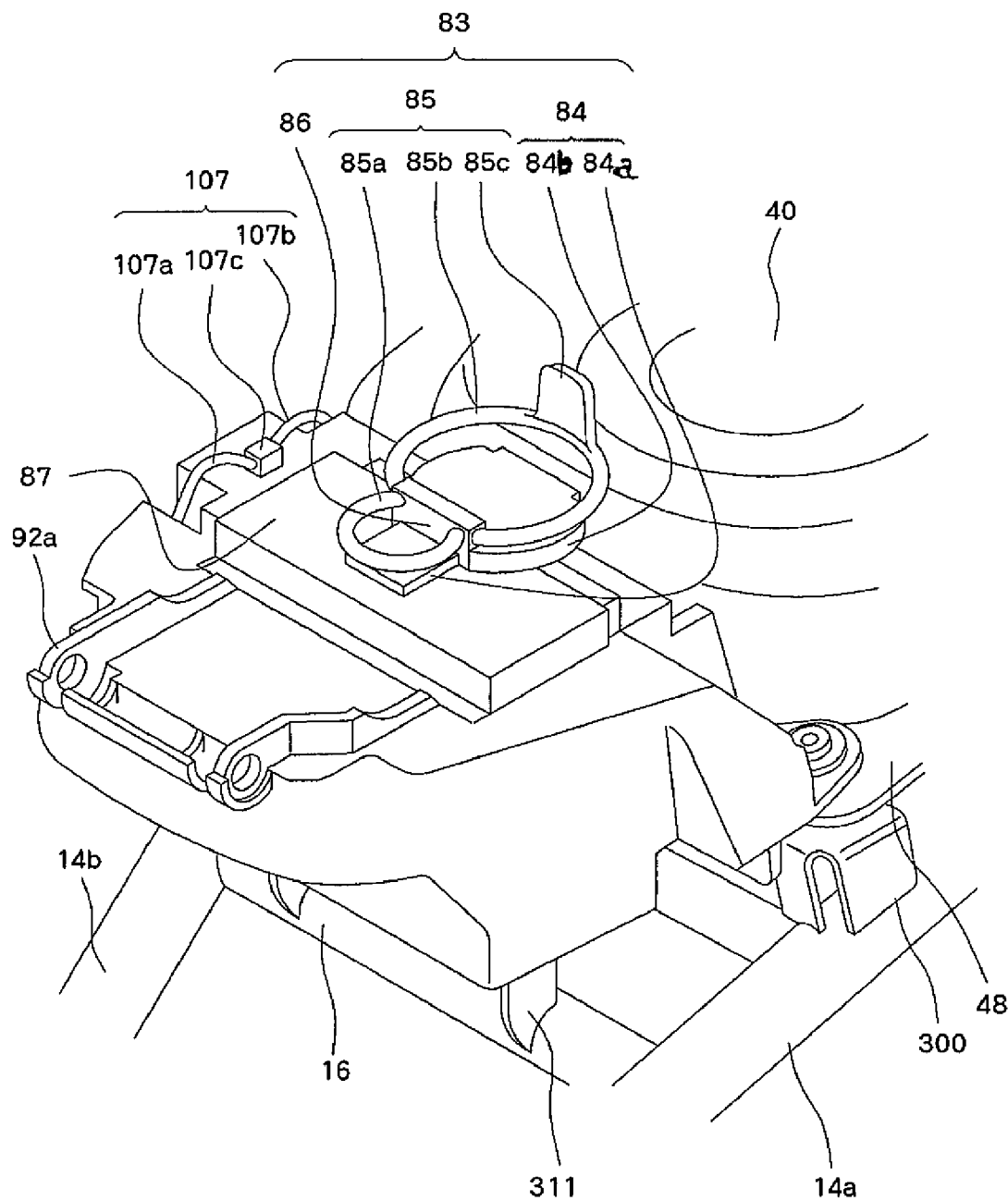
FIG. 21 is a perspective view of the battery case of FIG. 20 without an upper cover.

Battery case 80 is now described in detail. FIG. 20 is a perspective view of battery case 80; and FIG. 21 is a perspective view of battery case 80 without an upper cover 82 as in FIG. 20.

Battery case 80 includes a top-open casing 81 for accommodating battery 87, with upper cover 82 disposed on top of casing 81, and a fixing section for fixing upper cover 82 to casing 81.

Battery case 80 is fixed to part of body frame 10 in front of and close to fuel tank 40. Specifically, the part of the pair of left and right seat rails 14a and 14b which extends forward of fuel tank 40 has a cross member 16 which is part of body frame 10 and extends in the width direction to connect seat rails 14a and 14b. A front-end support member 311 is fixed on cross member 16 for supporting battery case 80 (see FIG. 4). Casing 81 is fixed on front-end support member 311, so that battery case 80 is fixed to cross member 16 through front-end support member 311. Casing 81 has a plate-like rear projection 81a projecting to the rear (see FIGS. 2 and 3).

A front end part 82a of upper cover 82 pivots on a hinge 92a of front support section 92. Specifically, upper cover 82 can be opened or closed by rotation of front end part 82a about a hinge shaft 92b (see FIG. 2) of hinge 92a. Upper cover 82 has a plate-like front projection 82b projecting to the front.

Referring to FIG. 21, fixing section 83 includes a plate-like mount 84 disposed underneath upper cover 82, a ring-shaped band 85 on top of upper cover 82, and a through portion 86 passing through the center of upper cover 82 vertically. The whole fixing section 83 is made of rubber, in which mount 84, band 85, and through portion 86 are integrally formed.

Mount 84 includes a front mount 84a extending from the lower end of through portion 86 toward the front and a rear mount 84b extending from the lower end of through portion 86 toward the rear, and is disposed between the lower surface of upper cover 82 and battery 87 in casing 81. Front mount 84a and rear mount 84b have different heights; front mount 84a is lower than rear mount 84b. The upper surfaces of front mount 84a and rear mount 84b are in contact with the lower surface of upper cover 82, and the lower surfaces are in contact with the upper surface of battery 87 in casing 81. Front mount 84a and rear mount 84b press down battery 87 in casing 81, on the lower surface of upper cover 82.

Band 85 includes a ring-shaped front band 85a extending from the upper end of through portion 86 toward the front and a ring-shaped rear band 85b extending from the upper end of through portion 86 toward the rear. Ring-shaped front band 85a and ring-shaped rear band 85b have different diameters; the diameter of ring-shaped front band 85a is smaller than that of ring-shaped rear band 85b. A plate-like tab 85c extends upward at the rear end of ring-shaped rear band 85b.

Front band 85a is engaged with front projection 82b of upper cover 82 (see FIG. 2). Specifically, the end of ring-shaped front band 85a can be brought into engagement with front projection 82b of upper cover 82 by drawing front band 85a to the front. Fixing section 83 is thus fixed to upper cover 82. Rear band 85b is engaged with a plate-like rear projection 81a projecting from the rear of casing 81 (see FIG. 2). Specifically, the end of ring-shaped rear band 85b can be brought into engagement with rear projection 81a of casing 81 by drawing rear band 85b to the rear with tab 85c. Thus upper cover 82 is fixed to casing 81 by fixing section 83.

A service terminal 107 is disposed under seat 20 and is exposed when seat 20 is opened upward. Service terminal 107 is disposed on the right in the width direction of upper cover 82 of battery case 80, for use in checking electronic equipment such as a speed meter (not shown) of motorcycle 1. The ends of positive and negative harnesses 107a and 107b are detachably joined together through a terminal cap 107c.

The straddle-type vehicle according to the invention is not limited to the foregoing embodiment. Inclined part 42 of fuel tank 40 is not necessarily inclined while curving in the front-rear direction; for example, when disposed forward of rotation shaft 3a of rear wheel 3, inclined part 42 may be inclined to the lower front in a line. Also, for example, extending part 43 of fuel tank 40 may further extend from the lower end of inclined part 42 downward into the lowest position of bottom 41. For example, extending part 43 may curve in the width direction or the front-rear direction. Also, for example, bottom 41 of fuel tank 40 may not have extending part 43, in which case, intake section 53 of fuel pump unit 50 may be disposed in the lowest part of fuel tank bottom 41. That is, intake section 53 is disposed close on the lowest part of inclined part 42.

The number and shape of front load receiving section 90 and rear load receiving section 91 are not limited to those shown in the embodiment. For example, when at least one of front load receiving section 90 and rear load receiving section 91 has at least two partial load receiving sections disposed apart from each other in the width direction, only rear load receiving section 91 may have the partial load receiving sections or both front load receiving section 90 and rear load receiving section 91 may have the partial load receiving sections. In this case, the partial load receiving sections may not necessarily be disposed side by side in the width direction but may be disposed in different positions in the front-rear direction.

For example, there may be only one front load receiving section 90 and one rear load receiving section 91. In this case, front load receiving section 90 and rear load receiving section 91 may not necessarily be disposed in the center in the width direction, but may be disposed on either of the right and left side in the width direction.

For example, front load receiving section 90 and rear load receiving section 91 may project from either seat 20 or fuel tank 40. In other words, front load receiving section 90 and rear load receiving section 91 may be either integrated with tank cover 60, fuel tank 40, and seat 20 or may be separated therefrom. Front load receiving section 90 and rear load receiving section 91 are not necessarily shaped in a square pillar but may be shaped in a column or other polygonal pillar.

Front load receiving section 90 or rear load receiving section 91 may have a hinge that pivotally supports seat 20 or another component. That is, for example, front load receiving section 90 may have a hinge disposed at the front of fuel tank 40, for pivotally supporting the front end of seat 20. In this case, front load receiving section 90 is not necessarily disposed on upper surface 44 of fuel tank 40 facing seat 20, but may project from part of the surface of fuel tank 40.

Front load receiving section 90 and rear load receiving section 91 are not necessarily made of rubber. For example, front load receiving section 90 and rear load receiving section 91 may be made of a material elastically deformable when pressed by seat 20 deformed by a load to absorb the impact on seat 20. Specifically, for example, when front load receiving section 90 has a hinge that pivotally supports the front end of seat 20, front load receiving section 90 may be made of metal integrated with or separate from fuel tank 40.

Base 71 of protective member 70 is not limited to that of the foregoing embodiment provided that it is fixed to body frame 10 and can disperse an impact on pump cover 76. In other words, base 71 is not particularly limited provided that it is fixed to part of body frame 10, and is adjacent to, or in front of or behind fuel tank 40. Specifically, base 71 can be a three-dimensional member such as battery case 80, rear fender 4, or body cover 100.

Base 71 is not necessarily fixed to seat rails 14; for example, base 71 may be another part of body frame 10, which is fixed to and across the right and left frames arranged side by side in the width direction. In this case, for example, base 71 is wider than pump cover 76 in the width direction, and both ends of which in the width direction are fixed to part of the pair of right and left body frames. Protective member 70 is not necessarily made of resin but may be made of metal that can disperse an impact on pump cover 76.

Fixing section 83 of battery case 80 is not necessarily made of rubber but may be made of another reversibly elastic material. Service terminal 107 is not necessarily disposed adjacent to battery case 80; for example, it may be disposed under seat 20 to be exposed for use when seat 20 is opened.

The particular embodiments of the invention described in this document should be considered illustrative, rather than restrictive. Modification to the described embodiments may be made without departing from the spirit of the invention as defined by the following claims.

The invention claimed is:

1. A straddle-type vehicle comprising:
a rear wheel;
a seat, wherein at least a part of the seat is disposed above the rear wheel;
a fuel tank having a bottom including a part inclined in a front-rear direction of the vehicle above the rear wheel and below the seat; and
a fuel pump unit for supplying fuel in the fuel tank to an engine, the fuel pump unit having a body extending on and along the inclined part of the bottom in the fuel tank and a discharge section located at an upper end of the body, wherein at least a portion of the discharge section is outside of an upper portion of the fuel tank to discharge fuel to the outside of the fuel tank.

2. The straddle-type vehicle according to claim 1, wherein the inclined part of the bottom is disposed above a front of the rear wheel with respect to a rotation shaft thereof, and is inclined to a lower front.

3. The straddle-type vehicle according to claim 1, wherein the seat is disposed on a first load receiving section and a second load receiving section disposed apart from each other in the front-rear direction to receive a load on the seat; and
the discharge section is disposed between the first load receiving section and the second load receiving section.

4. The straddle-type vehicle according to claim 1, wherein the seat includes a first seat portion for a first rider and a second seat portion for a second rider on the back of the first rider; and
the discharge section is disposed between the first seat portion and the second seat portion.

5. The straddle-type vehicle according to claim 4, wherein the seat is disposed on a first load receiving section disposed under the first seat portion and a second load receiving section disposed under the second seat portion; and
the discharge section is disposed between the first load receiving section and the second load receiving section.

6. The straddle-type vehicle according to claim 1, wherein at least a part of the inclined part of the bottom is shaped like a saddle that straddles the rear wheel in the width direction.

7. The straddle-type vehicle according to claim 1, wherein the bottom further includes an extending part extending in a curve from a lower end of the inclined part into a lowest position of the bottom; and
the fuel pump unit includes an intake section connected to the body to suck the fuel, at least a part of the intake section being disposed on the extending part.

8. A fuel-tank assembly comprising:
a fuel tank mountable to a straddle-type vehicle including a seat having at least a part disposed above a rear wheel, the fuel tank having a bottom including a part inclined in a front-rear direction of the vehicle above the rear wheel and below the seat; and
a fuel pump unit for supplying fuel in the fuel tank to an engine, the fuel pump unit having a body extending on and along the inclined part of the bottom in the fuel tank and a discharge section located at an upper end of the body, wherein at least a portion of the discharge section is outside of an upper portion of the fuel tank to discharge fuel to the outside of the fuel tank.

9. A straddle-type vehicle comprising:

a fuel tank having a bottom including a part inclined in a front-rear direction of the vehicle; and a fuel pump unit for supplying fuel in the fuel tank to an engine, the fuel pump unit having a body extending on and along the inclined part of the bottom in the fuel tank and a discharge section located at an upper end of the body, wherein at least a portion of the discharge section is outside of an upper portion of the fuel tank to discharge fuel to the outside of the fuel tank.

* * * * *